US008253969B2

(12) United States Patent
Austin et al.

(10) Patent No.: US 8,253,969 B2
(45) Date of Patent: *Aug. 28, 2012

(54) PORTABLE ELECTRONIC PRINTER

(75) Inventors: Rickey G. Austin, Lisbon, IA (US); Arvin D. Danielson, Solon, IA (US)

(73) Assignee: Intermec IP Corp., Everett, WA (US)

( * ) Notice: Subject to any disclaimer, the term of this patent is extended or adjusted under 35 U.S.C. 154(b) by 759 days.

This patent is subject to a terminal disclaimer.

(21) Appl. No.: 11/854,679

(22) Filed: Sep. 13, 2007

(65) Prior Publication Data

US 2008/0019755 A1 Jan. 24, 2008

Related U.S. Application Data

(63) Continuation of application No. 10/737,536, filed on Dec. 16, 2003, now Pat. No. 7,450,265, which is a continuation of application No. 09/289,243, filed on Apr. 9, 1999, now Pat. No. 6,665,089.

(60) Provisional application No. 60/081,412, filed on Apr. 10, 1998, provisional application No. 60/081,372, filed on Apr. 10, 1998, provisional application No. 60/081,381, filed on Apr. 10, 1998, provisional application No. 60/084,435, filed on May 6, 1998.

(51) Int. Cl.
*G06F 15/00* (2006.01)
*B41J 29/38* (2006.01)

(52) U.S. Cl. .......................................... 358/1.18; 347/9

(58) Field of Classification Search .................. 358/1.18
See application file for complete search history.

(56) References Cited

U.S. PATENT DOCUMENTS

| | | | | |
|---|---|---|---|---|
| 5,116,149 | A * | 5/1992 | Yamasaki | 400/314.1 |
| 5,238,315 | A | 8/1993 | Kitabata | |
| 5,631,677 | A * | 5/1997 | Horigome et al. | 347/19 |
| 5,688,057 | A * | 11/1997 | Wright et al. | 400/82 |
| 7,450,265 | B1 * | 11/2008 | Austin et al. | 358/1.8 |
| 2001/0005464 | A1 * | 6/2001 | Funada | 400/578 |

* cited by examiner

*Primary Examiner* — Saeid Ebrahimi Dehkordy
(74) *Attorney, Agent, or Firm* — Shook Hardy & Bacon LLP

(57) ABSTRACT

A method and apparatus for printing information. The printer including a paper feed motor, a carriage motor and a printer control system. The system causing the paper feed motor and the carriage motor to move at least partially simultaneously.

10 Claims, 22 Drawing Sheets

PORTABLE ELECTRONIC PRINTER

CROSS-REFERENCE TO RELATED APPLICATIONS

This application is a continuation of and claims priority pursuant to 35 U.S.C. Section 120 from U.S. Pat. No. 7,450,265 filed on Dec. 16, 2003 and entitled "Control System And Method For A Portable Electronic Printer", which is a continuation of U.S. Pat. No. 6,665,089, filed Apr. 9, 1999, which application claims priority under 35 U.S.C. Section 119 to the following U.S. provisional patent applications: Provisional Application No. 60/081,412, filed Apr. 10, 1998, Provisional Application No. 60/081,372, filed Apr. 10, 1998, Provisional Application No. 60/081,381, filed Apr. 10, 1998, and Provisional Application No. 60/084,435, filed May 6, 1998.

The above identified applications are all hereby incorporated by reference in their entireties. The two microfiche appendices of Provisional Application No. 60/084,435 are also hereby incorporated herein by reference in their entireties.

STATEMENT REGARDING FEDERALLY SPONSORED RESEARCH OR DEVELOPMENT

None.

FIELD OF THE INVENTION

The present invention generally relates to the field of portable electronic printers, and particularly to an electronic printer for utilization with a portable hand-held computer.

BACKGROUND OF THE INVENTION

Portable hand-held computers are typically utilized for data collection and management in the modem computerized business world. For example, commercial transactions for the sale of goods may be stored in a portable hand-held computer that is carried by delivery personnel to a customer's place of business. After the delivery driver enters execution of the transaction into the hand-held computer, an invoice verifying the date, time and contents of the delivery is desired. The invoice may be conveniently printed with a portable printer to which the delivery driver may connect the hand-held computer.

The usefulness of portable printers has been enhanced by efforts in reducing the size and modularity of printers when compared to their respective forerunners. Also, minimization of tasks may further the utility of portable printers by route service people in operating the printers.

It is highly desirable to increase the efficiency and productivity of the user of the printer by improving the speed at which the printer operates. It would therefore be advantageous to provide a printer having an improved control system for controlling the operation of the printer motor controls and printing head such that the effective printing time for a given print job is reduced.

Furthermore, it is highly desirable that a portable printing system is adaptable to a variety of environments or applications. Thus, it would be desirable to provide a printer having a memory and file system that allows for updating program code and data such as printer fonts and character systems. The printer would therefore be capable of being adapted to a variety of applications for use with a multiplicity of countries or languages. An advanced printer control system would additionally provide advanced control features such as the ability to cancel printing jobs with a serial interface without having to first print the entire print buffer, or to verify the integrity of files downloaded into an updateable file system, among other advantages.

It is also highly desirable that a printer system be able to adjust its print settings and print time so as to adequately function in different environments or with different print media. For instance, in extremely cold environments, it is desirable to increase the impact force at which a contact printer strikes the paper when printing. In addition, when thick print media is used (e.g. five part carbon copy paper as opposed to three part carbon copy paper) it is likewise desirable to increase the impact force at which a contact printer strikes the print media. Environmental conditions such as temperature, barometric pressure, or atmospheric pressure may also affect other print settings of a print system. Thus, in a laser printer, a contact printer or an ink jet printer, it may be desirable to increase the temperature of operation of the printer when the print system is used in extreme environmental conditions.

SUMMARY OF THE INVENTION

The present invention is directed to a control system for a portable electronic printer. The control system of the present invention implements, among other things, a method for performing a self-test of the hardware of a portable electronic printer, a method for monitoring the hardware of a portable electronic printer for a failure, a method for diagnosing a portable electronic printer, a method for booting a portable electronic printer having both volatile and non-volatile memory, a method for controlling the printing of data received from a serial transmission line whereby printing may be canceled, a method for controlling a printing system such that code or data in the printing system may be updated, a method of verifying a downloaded file in a printing system, a method for determining a communications protocol in a printing system, and a method for controlling communications in a printing system during a diagnostic routine.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE SEVERAL VIEWS OF THE DRAWINGS

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

DETAILED DESCRIPTION OF THE INVENTION

Reference will now be made in detail to the presently preferred embodiment of the invention, an example of which is illustrated in the accompanying drawings.

Figure 1:
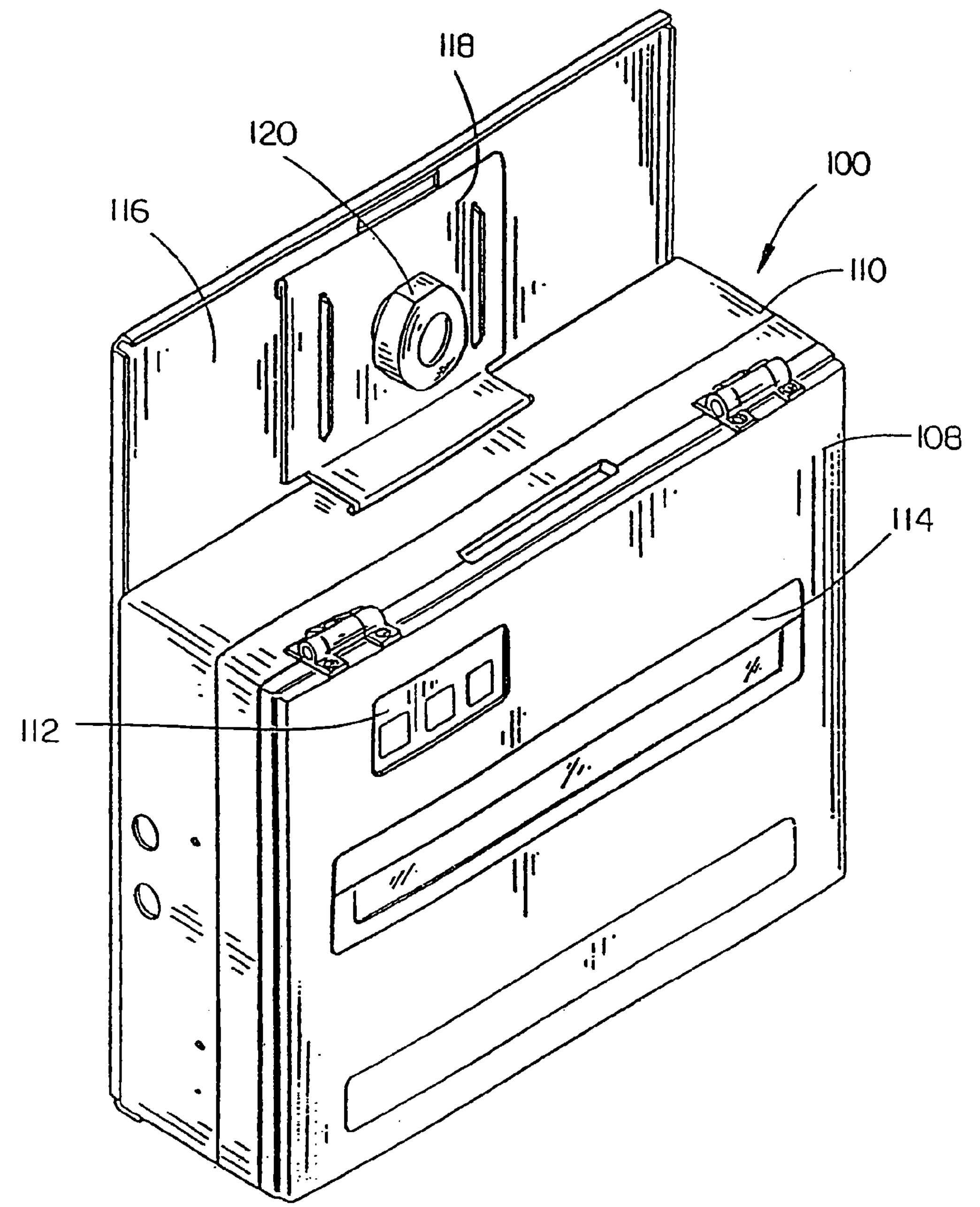
FIG. 1 is an illustration of a portable electronic printer in accordance with the present invention.

Referring now to FIG. 1, a portable electronic printer in accordance with the present invention will be discussed. The printer 100 comprises a printer housing 110 having a top cover 108 and a control keypad 112 and paper egress aperture 114 disposed on top cover 108. For mounting of printer 100 on a vertical surface such as a wall of a service vehicle, printer 100 may be affixed to a mounting plate 116. A mounting bracket 118 and mounting knob 120 robustly and securely fasten printer 100 to mounting plate 116 yet allow for rapid and simple removal or replacement of printer 100 by a user without requiring tools.

Figure 2:
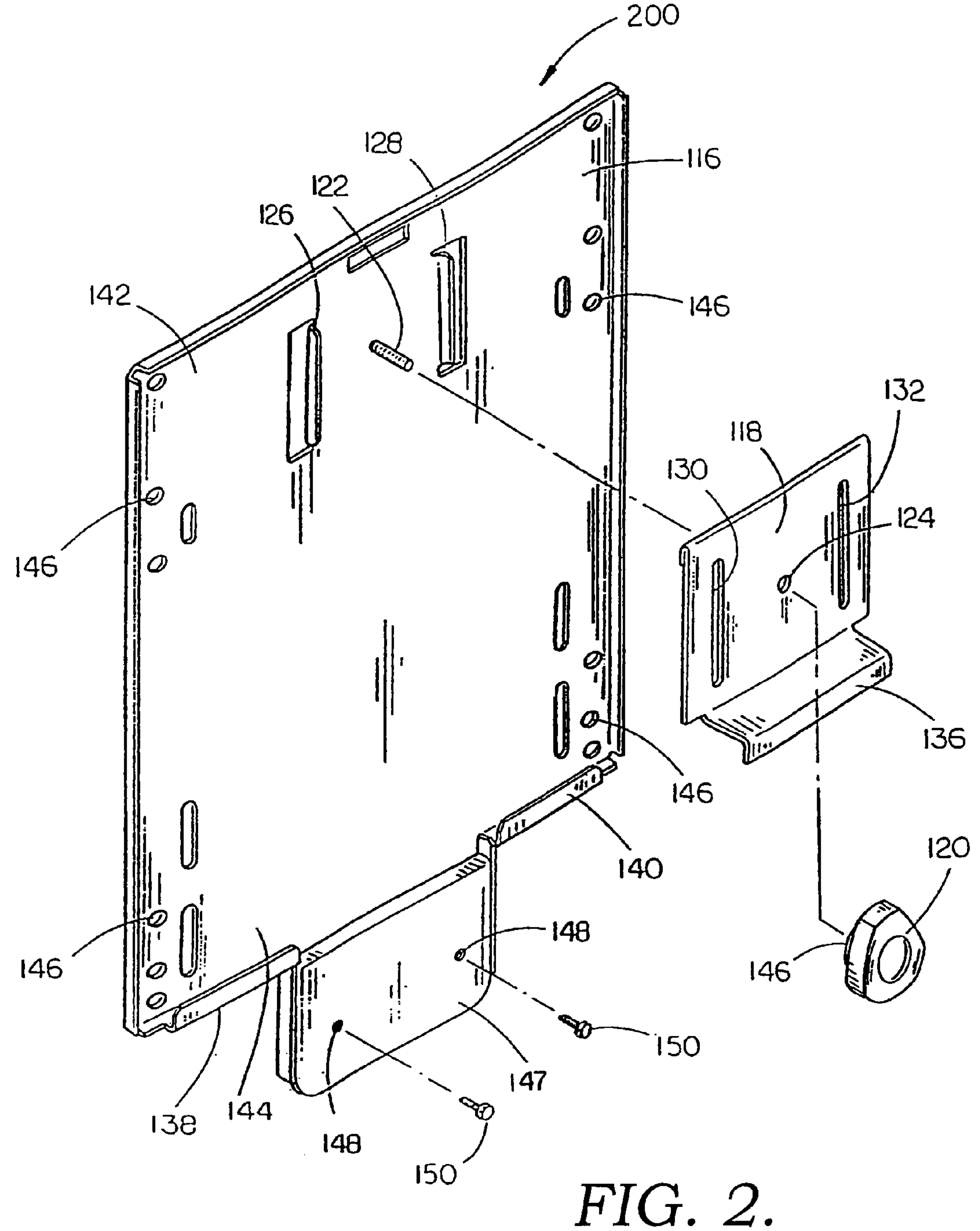
FIG. 2 is an illustration of a mounting system for the portable electronic printer of the present invention.

Referring now to FIG. 2, a mounting system for the portable electronic printer of the present invention is shown. Mounting system 200 generally comprises mounting plate 116, mounting bracket 118 and mounting knob as shown in FIG. 1. A threaded bolt 122 is cantileveredly disposed at the top end 142 of mounting plate 116. Threaded bolt 122 and mounting knob together function as a fastener for fastening mounting bracket 118 to mounting plate 116. Mounting bracket 118 has an aperture 124 for allowing passage of bolt 122 through aperture 124 in a clearance fit relationship. Mounting plate 116 further has tabs 126 and 128 extending perpendicularly from mounting bracket and adjacently disposed on either side of bolt 122. Mounting bracket includes linear slits 130 and 132 corresponding to tabs 126 and 128 which allow tabs 126 and 128 to pass therethrough as bolt 122 extends through aperture 124. The spatial positioning and alignment of bolt 122, aperture 124, tabs 126 and 128, and slits 130 and 132 constrain the position of mounting bracket 118 with respect to mounting plate 116. Mounting knob 120 includes a threaded cavity 146 that corresponds to and mates with threaded bolt 122, thereby allowing mounting knob 120 to be threaded onto bolt 122 and securely fasten mounting bracket 118 against mounting plate 116.

Mounting plate 116 further includes an array of apertures 146 that allow mounting plate 116 to be securely mounted to a vertical support surface, e.g., bolted to a wall. Tabs 138 and 140 are disposed near the bottom end 144 of mounting plate 116 and arranged parallel to plate 116. A mounting tab 147 is also disposed at the bottom 144 of mounting plate 116 for allowing a printer accessory such as a paper tray (not shown) to be mounted to mounting plate 116. Mounting tab 147 may include threaded cavities for accepting threaded bolts 150 in order to fasten an accessory to mounting tab 147.

Figure 3:
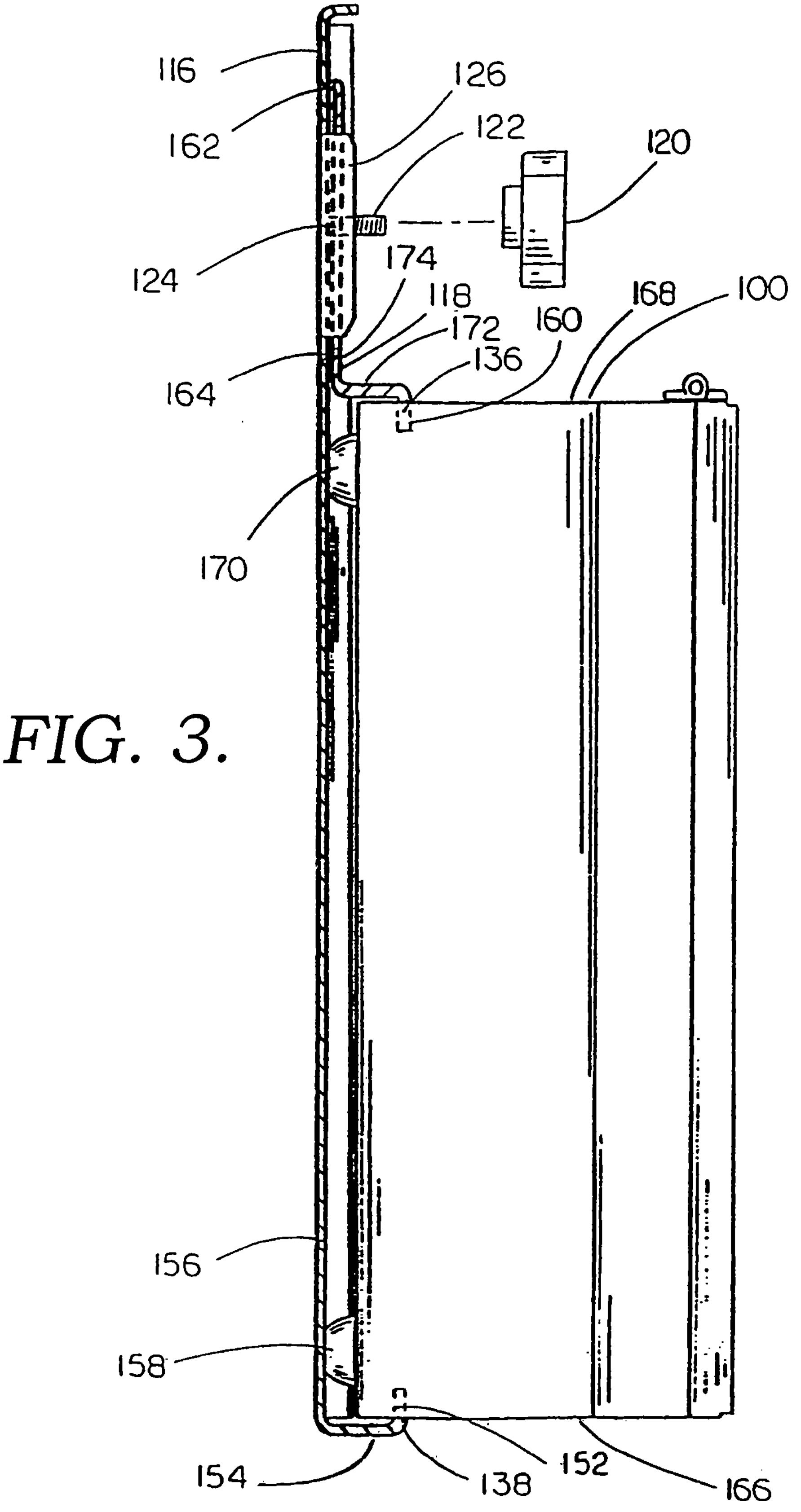
FIG. 3 is an illustration of a printer and printer mounting system of the present invention.

Referring now to FIG. 3, a printer and printer mounting system of the present invention will be discussed. Printer 100 includes a slot 152 disposed at the bottom side 166 of printer. When printer 100 is mounted onto mounting plate 116, tab 138 of mounting plate extends into slot 152 of printer 100. When mounting plate 116 is attached to a vertical support surface, printer 100 is supported by tab extension 154 of mounting plate 116. Tab 138 prevents movement of printer 100 in a direction perpendicular to mounting plate 116. Printer foot 158 provides a spacing function for printer 100 by spacing slot 152 in alignment with tab 138 when printer foot 158 contacts the vertical surface 156 of plate 116. The size of foot 158, the length of tab extension, and the position of slot 152 are selected to allow such a relationship.

A slot 160 is similarly disposed at a top side 168 of printer 100 for allowing a tab 136 of bracket 118 to extend into slot 160 in a manner similar to the extension of tab 138 into slot 152 at the bottom side 166 of printer 100. Bracket 118 is affixed to plate 116 by allowing passage of bolt 122 and tab 126 through aperture 124 and slit 130, respectively. Bracket 118 includes a folded tab 162 as shown which contacts vertical surface 156 of plate 116. Printer foot 170 provides a spacing function for printer 100 in a manner similar to that provided by printer foot 158. Printer foot 170 spaces slot 160 in alignment with tab 136 when printer foot 170 contacts the vertical surface 156 of plate 116 when bracket 118 is disposed onto bolt 122. The size of foot 170, the thickness of folded tab 162, the length of tab extension 172 of bracket 118 and the position of slot 136 position the bottom end 174 of bracket 118 a distance away from vertical surface 156 of plate 116 when folded tab 162 contacts vertical surface 156 of plate 116 and tab 136 extends into 10 slot 160 of printer 160 such that a gap 164 is formed between bottom end 174 of bracket 118 and vertical surface 156 of plate 116. Thus, bracket 118 functions as a lever wherein folded tab 162 functions as the fulcrum of the lever.

As mounting knob 120 is threaded onto bolt 122, knob 120 applies force to bracket 118. The force generated by the threading of knob 120 onto bracket 118 is transferred from bracket 118 to printer 100 at slot 160 via tab 136, thereby causing bracket 118 to pivot about the fulcrum point provided by folded tab 162, moving bottom end 174 of bracket 118 toward vertical surface 156 of plate 116 and causing gap 164 to diminish. Printer feet 158 and 170 provide resistance to the applied force through compression of feet 158 and 170 against vertical surface 156. Printer feet 158 and 170 preferably comprise a rugged, springy, compressible material having a compliance (where the compliance of a spring is the reciprocal of stiffness and is measured in inverse newtons) selected to robustly secure printer 100 in contact with plate 166 and to provide shock absorption and transfer of energy applied to either plate 116 or printer 100. Printer is thereby ruggedly affixed to a vertical support surface to which mounting plate 116 is attached.

Figure 4:
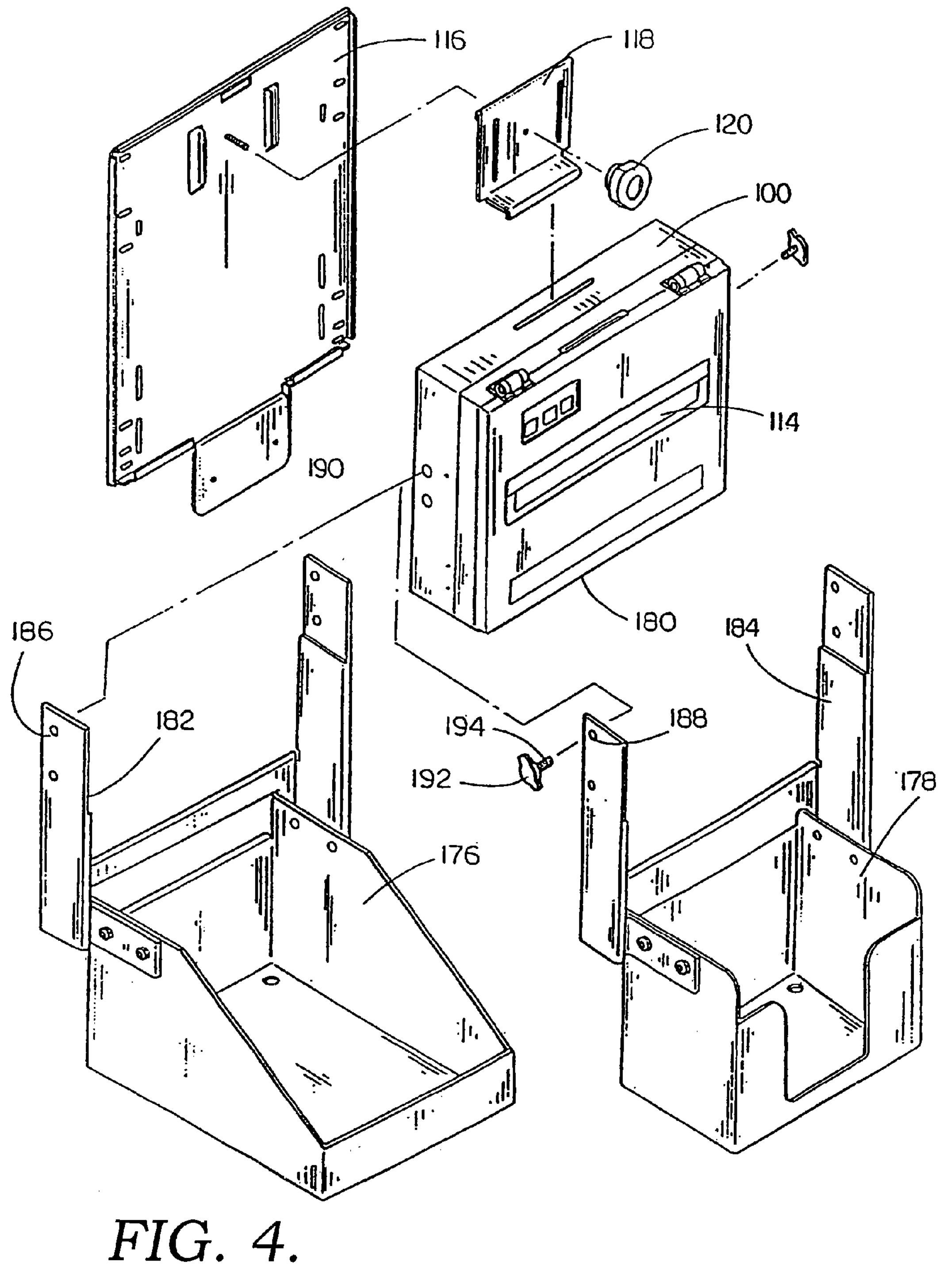
FIGS. 4 and 5 are illustrations of an assembly of a printing system in accordance with the present invention.
Figure 5:
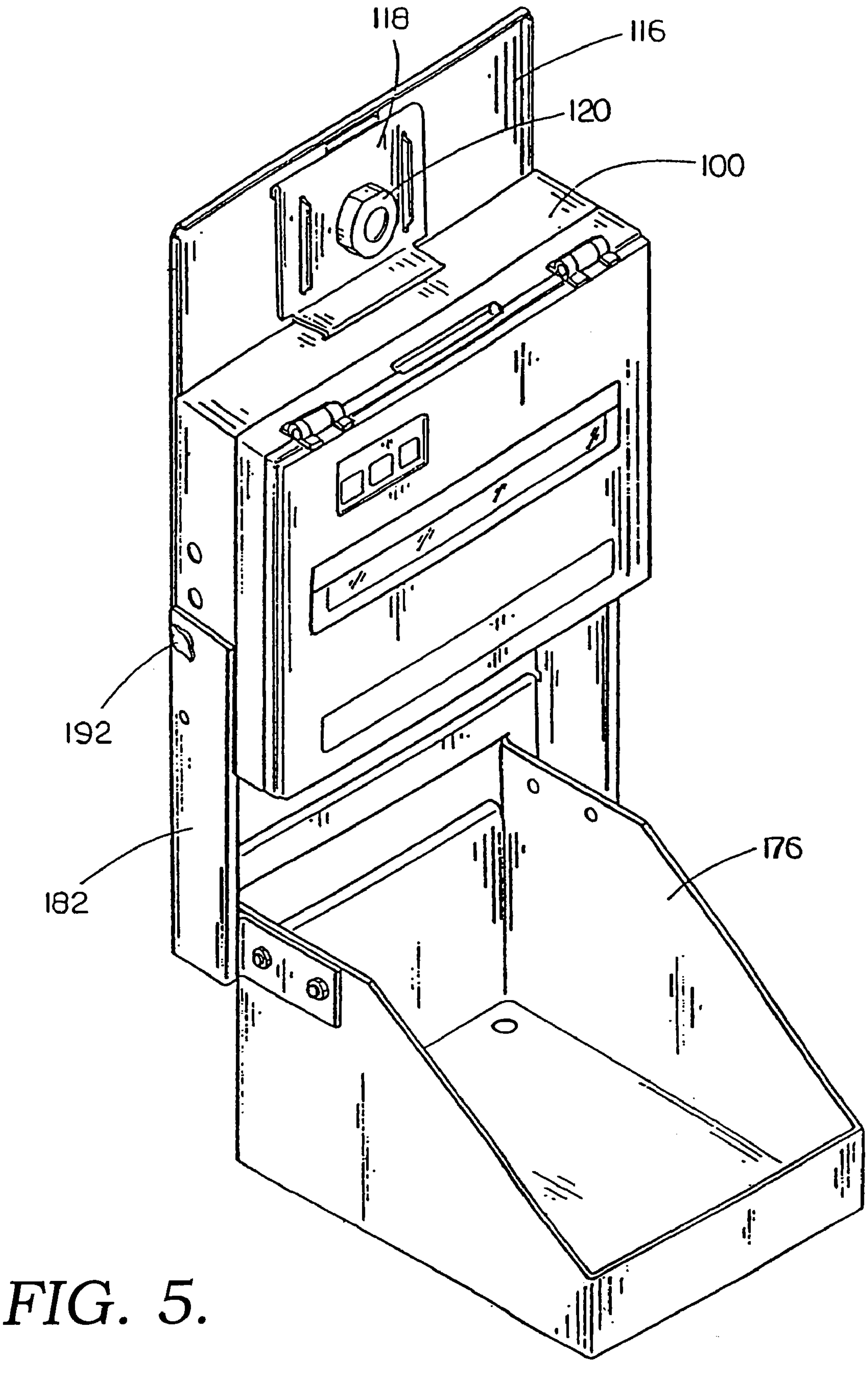

Referring now to FIGS. 4 and 5, an assembly of a printing system in accordance with the present invention will be discussed. As can be seen in FIG. 4, printer 100 may be quickly and easily attached to mounting plate 116 and secured thereto with mounting bracket 118 and mounting knob 120. Additionally, paper trays 176 and 178 may be attached to printer 100. Paper tray 176 may carry paper divided into elongated sections and paper tray 178 may carry paper of shorter sections. Paper loaded in either paper tray 176 or 178 is typically continuous-form including perforations delineating each individual page such that an entire series of pages may be fed into printer 100 via a paper intake aperture and emitted from paper egress aperture 114, for example. Paper may be tractor or sprocket fed wherein rotatably mounted pins (not shown) in printer 100 engage with a row of holes disposed along either edge of the paper such that the paper is driven through printer 100 via movement of the pins.

Paper trays 176 and 178 include support brackets 182 and 184 each having apertures 186 and 188 corresponding to a threaded cavity 190 of printer 100. Apertures 186 and 188 align with cavity 190 to allow passage of a support bracket mounting knob 192 having a threaded bolt that passes through apertures 186 and 188 into cavity 190, thereby fastening either bracket 182 or 184 to printer 100 according to the selected paper tray. A completely assembled printer mounting system is shown in FIG. 5.

Figure 6:
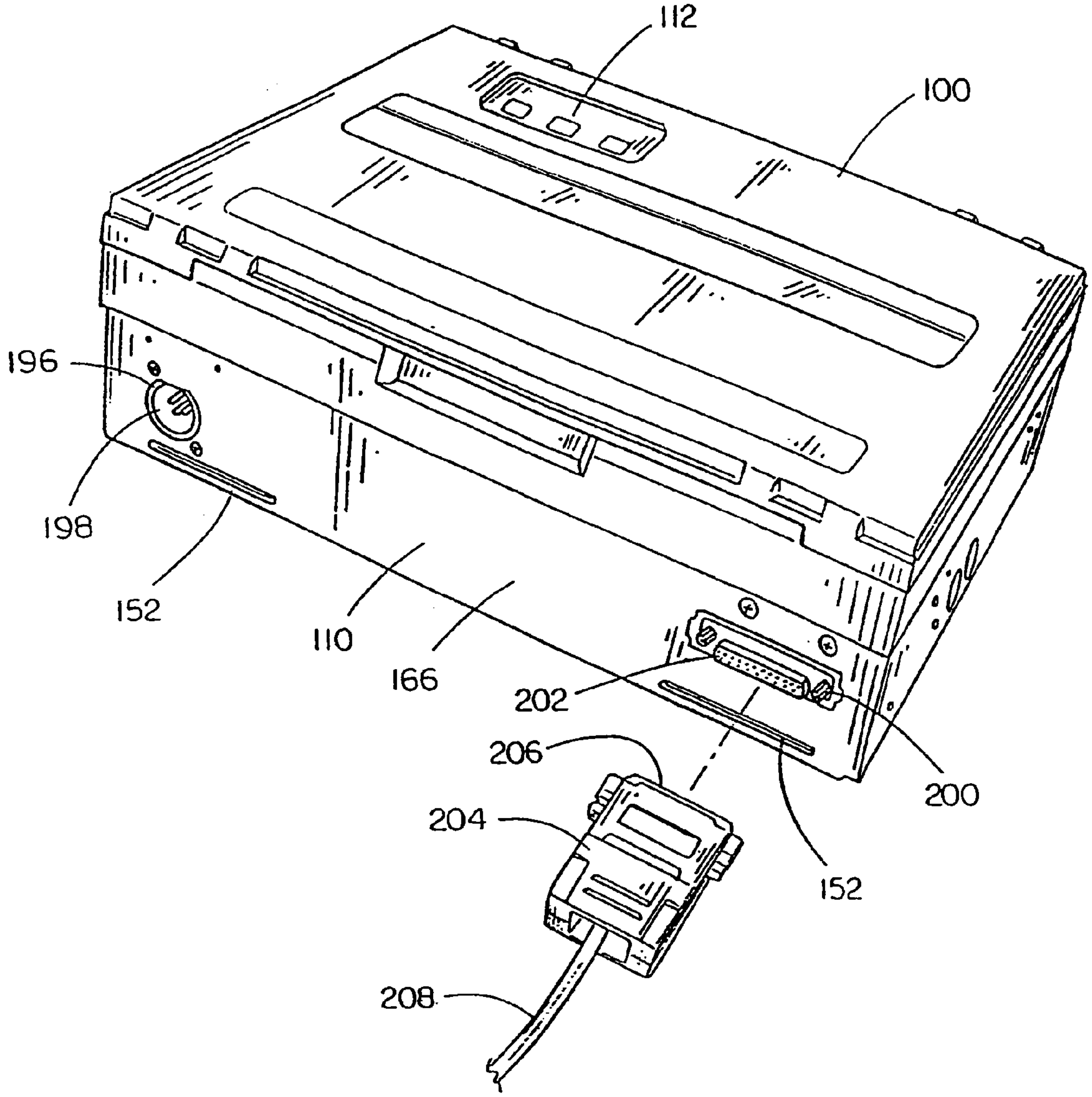
FIG. 6 is an illustration of a printer in accordance with the present invention.

Referring now to FIG. 6, a printer in accordance with the present invention will be discussed. Printer 100 includes a power adapter port 196 disposed at the bottom side 166 of printer 100 for connecting the printer to an external power source. The power source may be an AC or a DC power source, for example, wherein printer 100 conditions the signal appropriately into a form and level appropriate for powering the printer. Power maybe received at one or more input pins 198 of port 196.

Printer 100 may further include a data port 200 for transferring information 20 between printer 100 and an external device (not shown). Data port 200 may be a parallel port and include a female receptacle 202 for coupling with a male receptacle 206 of a connector 204 of a parallel port cable 208 such that data may be transferred between printer 100 and an external device. In one embodiment of printer 100, parallel port 200 is in compliance with a Centronics parallel interface standard, a standard for parallel data exchange between computers and peripheral devices such as printer 100. As can be seen in FIG. 6, printer 100 includes slots 152 for receiving tabs 138 and 140 as shown in FIGS. 2 and 3.

Figure 7:
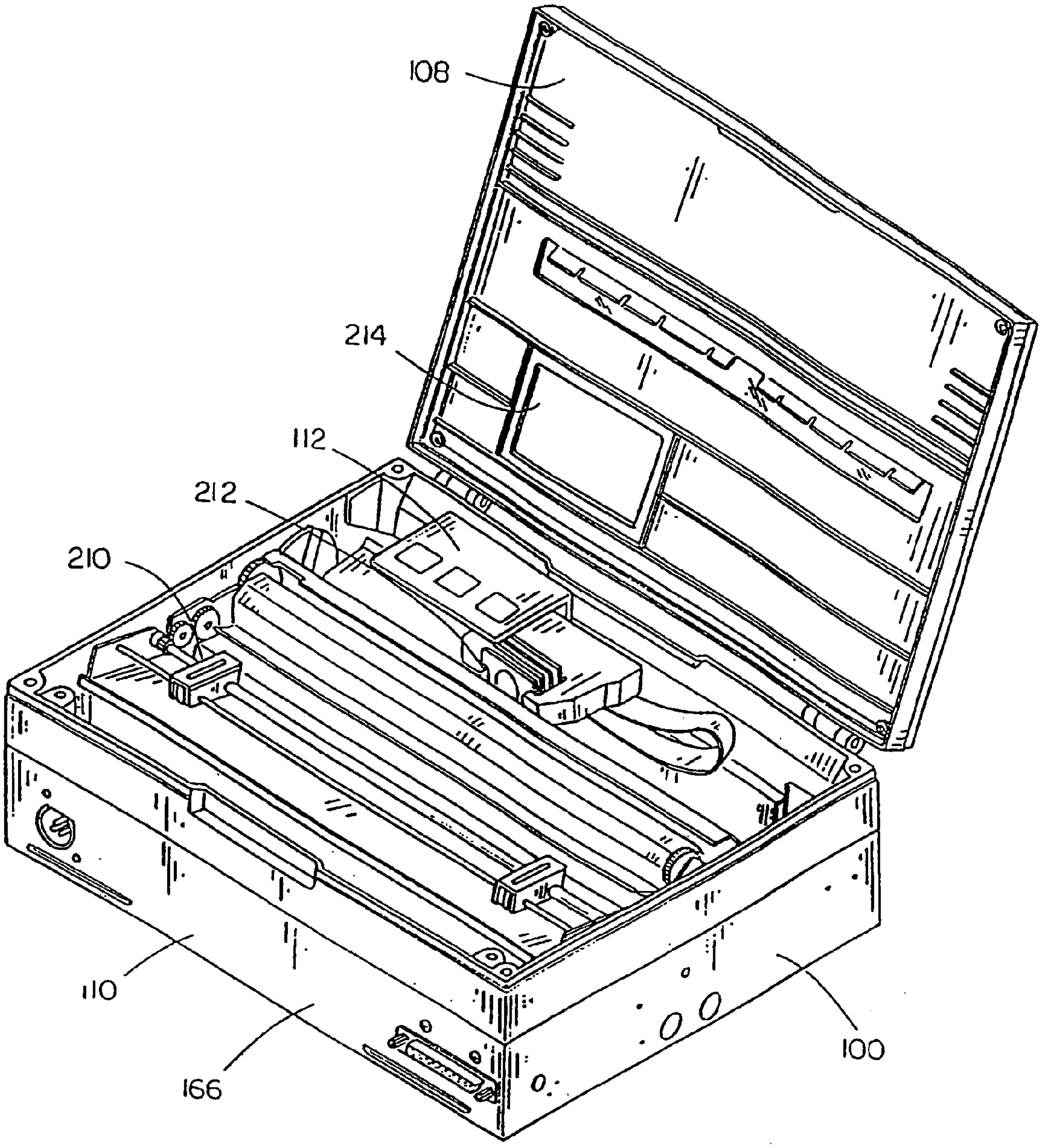
FIG. 7 is an illustration of the internal mechanisms of a printer of the present invention.

Referring now to FIG. 7, the internal mechanisms of a printer of the present invention will be discussed. Top cover 108 of printer 100 opens to expose the internal mechanisms of printer 100. A keypad aperture 214 is formed in top cover 108 to provide access and viewability of keypad and display 112 when top cover 108 is in a closed position. Printer 100 includes a paper feed mechanism for feeding paper through printer 100. As paper is fed through printer 100 with paper feed mechanism 210, a printing mechanism 212 prints characters received as printing data sent to printer 100 via data port 200 onto the paper.

Figure 8:
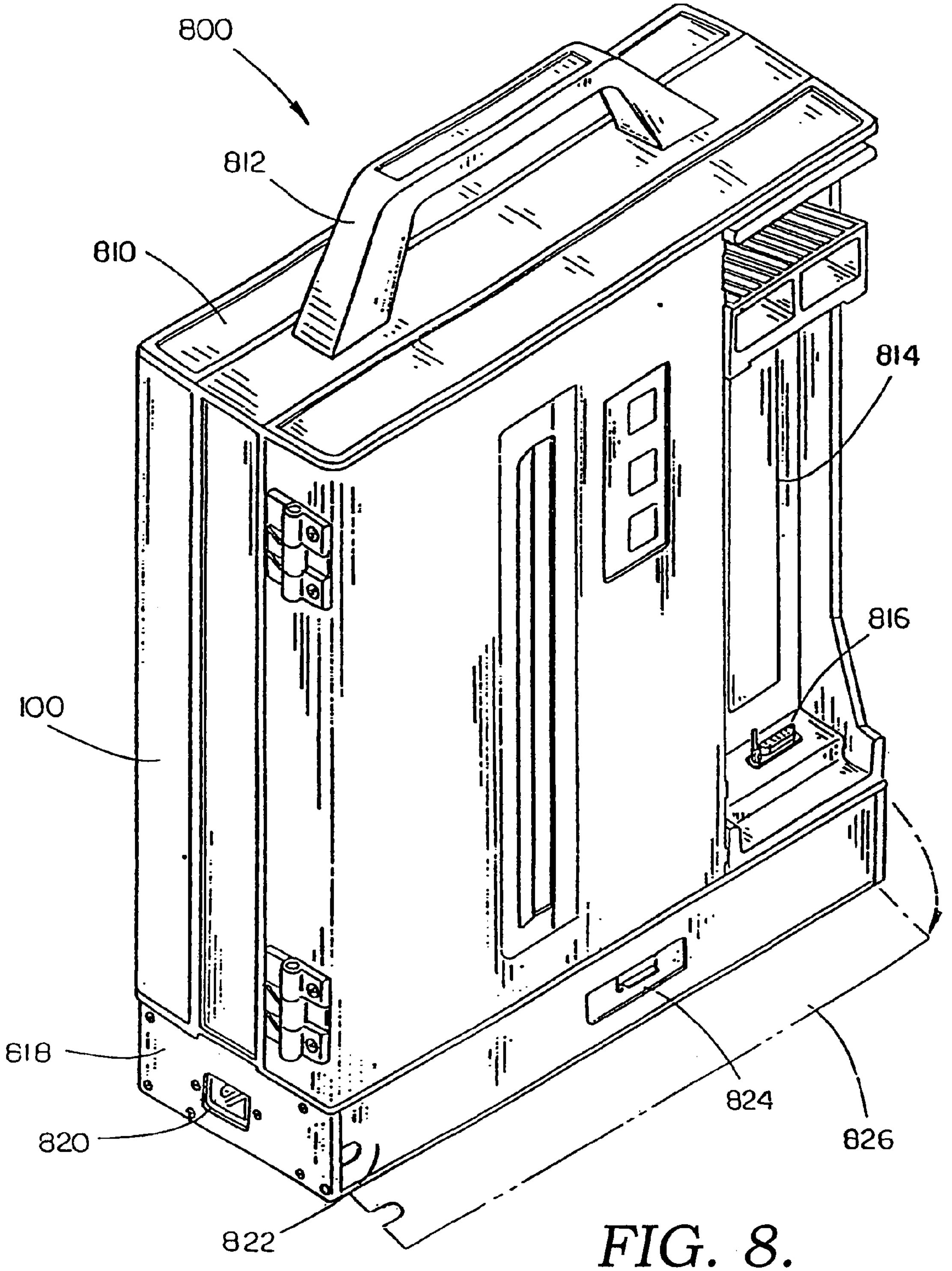
FIG. 8 is an illustration of a portable printing system in accordance with the present invention.
Figure 9:
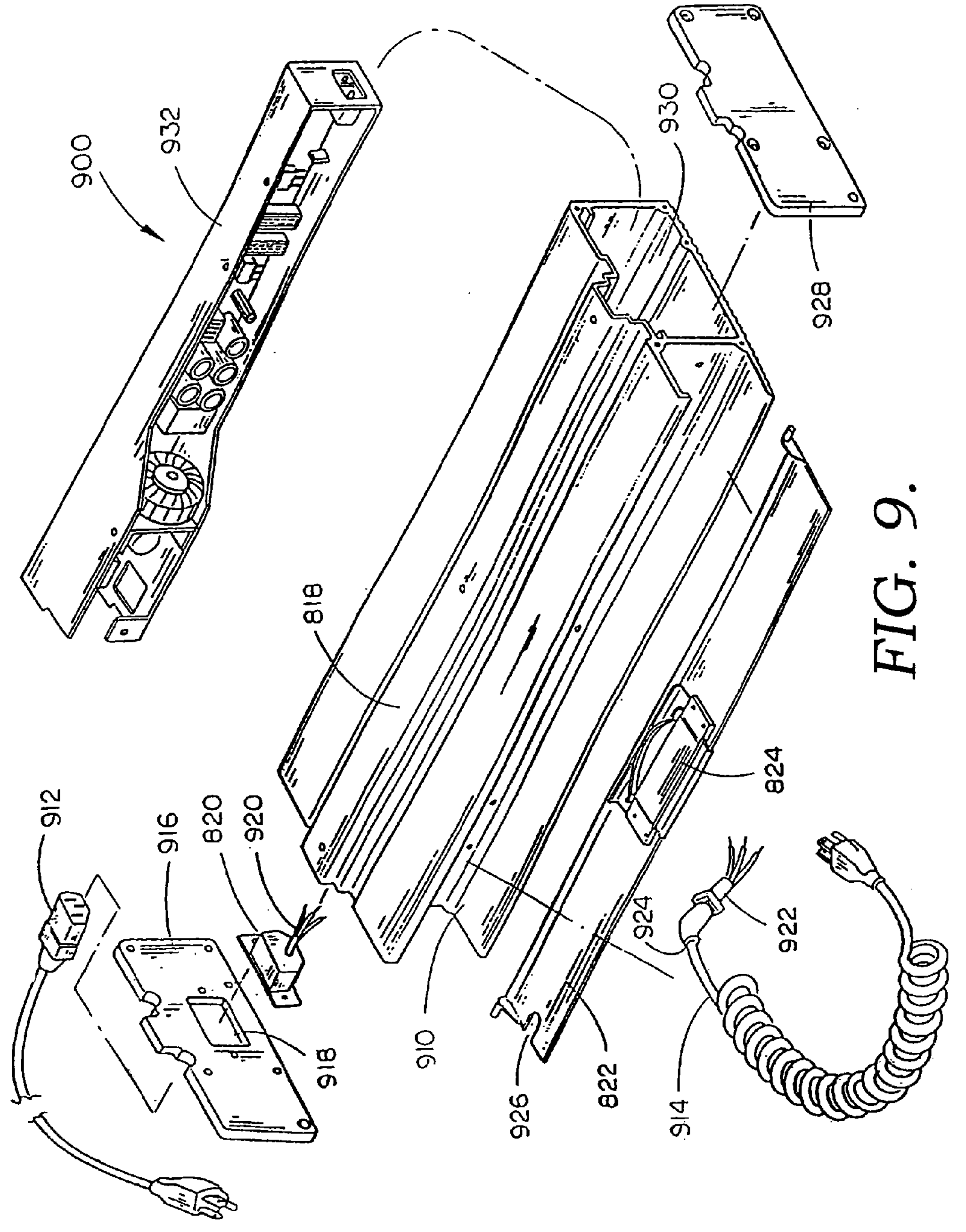
FIG. 9 is an illustration of a power supply foot assembly for a portable printing system in accordance with the present invention.

Referring now to FIG. 8, a portable printing system in accordance with the present invention will be discussed. The portable printing system 800 includes printer 100 of FIG. 1 and a frame 810 to which printer 100 is mounted for portable use thereof. Frame 810 includes a handle 812 at one end for allowing user to pick up and carry portable printing system 800. Frame 810 further includes a receptacle 814 for receiving a portable electronic data terminal (not shown) to be used in conjunction with printer 100. Receptacle 814 includes a connector 816 for electrically coupling the portable electronic data terminal with printer 100. A power supply foot 818 is attached at an end of frame 810 opposite to handle 812. Power supply foot 818 contains a power supply for supplying operating power to printer 100 and to a data terminal when disposed in receptacle 814 via connector 816. Power supply foot 818 includes a power cord receptacle 820 for receiving an end of a power cable (as shown in FIG. 9) to connect printing system 800 to a power source such as a power outlet from a wall socket or from vehicle power. While printing system is being transported during portable use, the power cable may be stowed behind a cover 822 that opens upon actuation of cover latch 824 to an open position 826.

Referring now to FIG. 9, a power supply foot assembly for a portable printing system in accordance with the present invention will be discussed. The power supply foot assembly 900 includes a power supply foot 818 that preferably comprises a strong, durable and lightweight material having a relatively high thermal conductivity such as aluminum. Power supply foot 818 includes a first cavity 910 for stowing a power supply cord such as a non-coiled IEC compliant cable 912 or a coiled cable 914, for example. An end plate 916 is disposed at one end of power supply foot 818 and includes an aperture for receiving IEC receptacle 820 having cabling 920 for connecting power to the power supply circuit 932 of power supply foot 818. Power supply cable may be temporarily removed from receptacle 820 for stowage in cavity 910. Power cable 914 may be permanently connected to power supply circuit 932 via cabling 922. When power cable 914 is connected to a power source an aperture 926 in foot cover 822 may power cable to extend from power supply foot 818 with cable end 924 passing through aperture 926 while cover 822 is in a closed position. Power supply foot includes a second cavity 930 for receiving power supply circuit 932. A second end plate 928 covers cavities 914 and 930 at the end of power supply foot 818 opposite to end plate 916.

Figure 10:
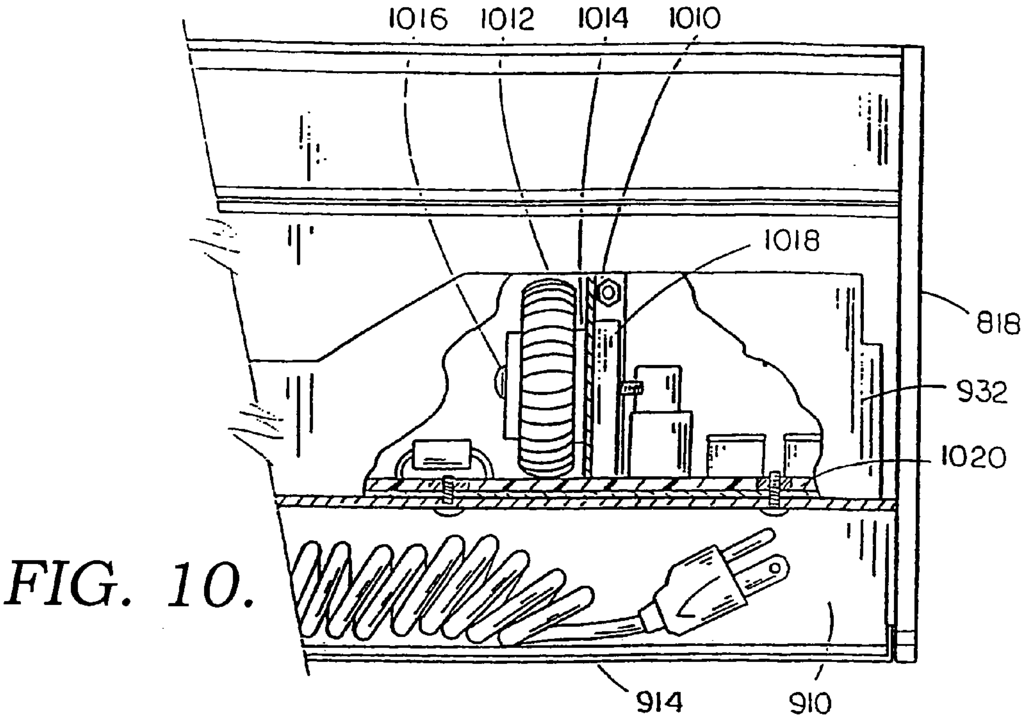
FIGS. 10 and 11 are illustrations of a power supply circuit assembly in accordance with the present invention.
Figure 11:
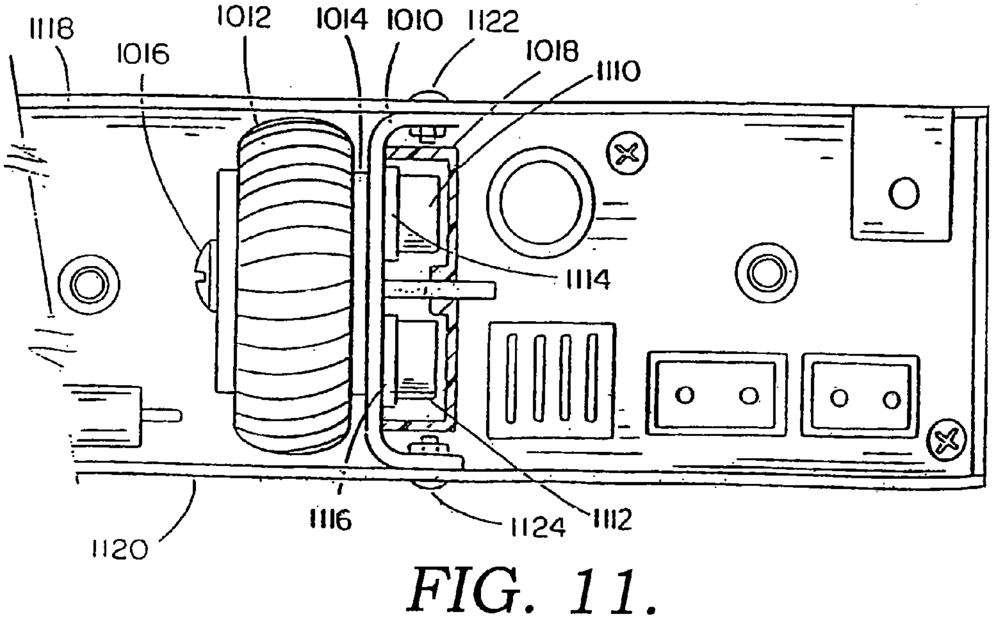

Referring now to FIGS. 10 and 11, a power supply circuit assembly in accordance with the present invention will be discussed. Power supply foot 818 includes a power supply circuit 932 mounted therein for conditioning power received from an external ac power source via cable 912 or cable 914. As shown in FIG. 10, cable 914 may be stowed in cavity 910 of power supply foot 818. Power supply circuit 932 includes a magnetic element that may be a toroidal inductor 1012 as shown. Inductor 1012 is bound one side by a spacer 1014. A fastener 1016 connects inductor 1012 and spacer 1014 to a mounting bracket 1010. Fastener 1016 further passes through and fastens a cover 1018 to bracket 1010 opposite to inductor 1012. Cover 1018 contains electronic components 1110 and 1112 which are power conditioning components that typically generate heat during use which should be dissipated, for example voltage regulators. Components 1110 and 1112 are in physical contact with bracket 1010 via silicone pads 1114 and 1116. Bracket 1010 is in turn mounted to side walls 1118 and 1120 of power supply circuit 932 via fasteners 1122 and 1124. Heat generated by components 1110 and 1112 is conducted through silicone pads 1114 and 1116 to bracket 1010. The heat received by bracket 1010 is further conducted to side walls 1118 and 1120.

Figure 12:
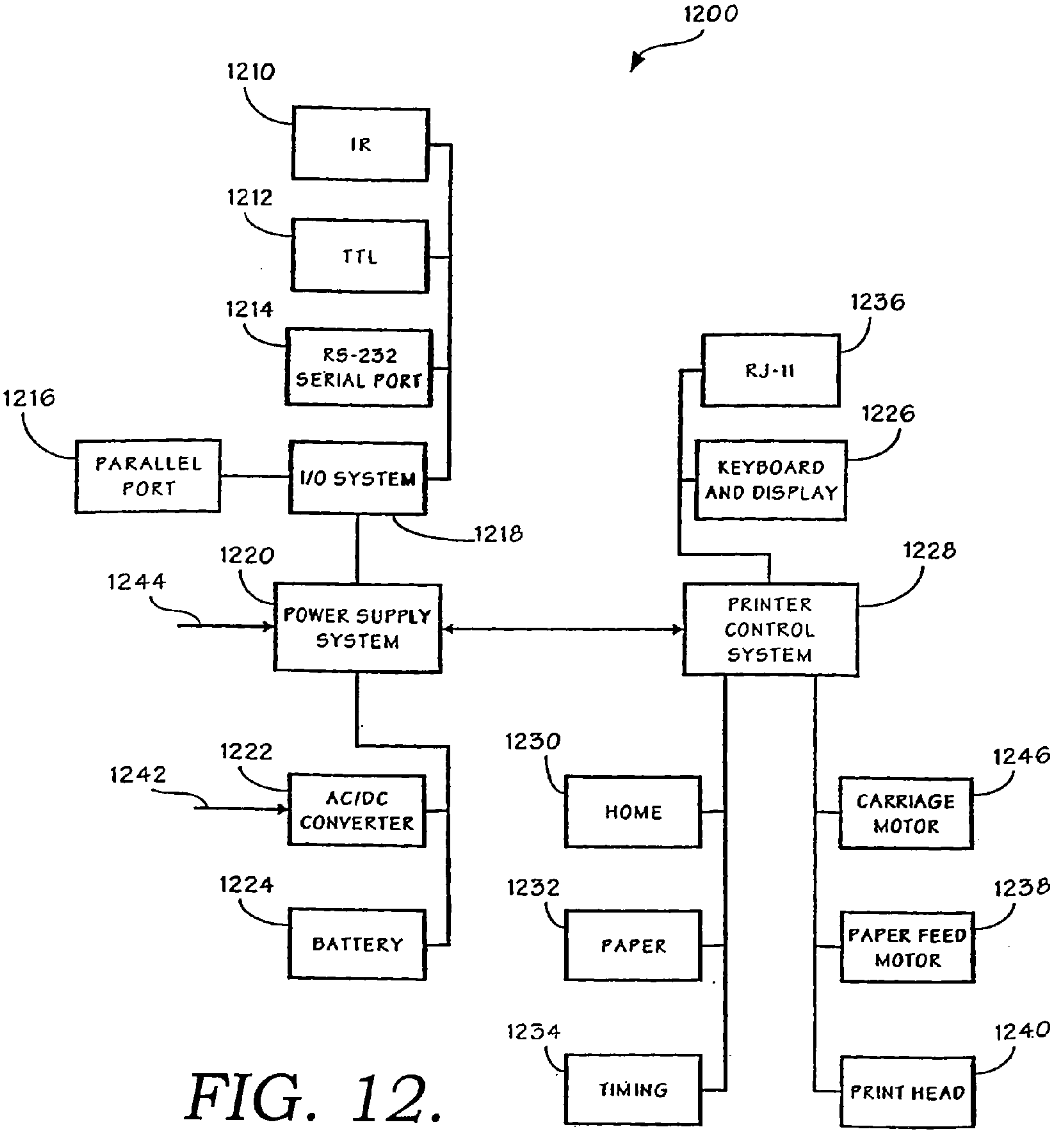
FIG. 12 is a block diagram of the electronic hardware components of a portable electronic printer of the present invention.

Referring now to FIG. 12, the electronic hardware components of a portable electronic printer of the present invention will be discussed. The hardware components 1200 generally include a printer control system 1228 coupled to a power supply system 1220, and an input/output (I/O) system 1218 coupled to printer control system 1228 via power supply system 1220. I/O system 1218 controls the transfer of data between printer 100 and an external device or a user. I/O system 1218 utilizes peripheral subsystems that provide an interface for information transfer. For example, I/O system 1218 couples to an infrared (IR) subsystem 1210 for infrared spectrum data communication which preferably conforms to a standard promulgated by the Infrared Data Association (IDA). I/O system 1218 further couples to a transistor-transistor logic (TTL) subsystem 1212 for communicating with devices having TTL type circuits (e.g., bipolar transistors directly coupled or coupled through resistors). Additionally, 110 system 1218 couples to a serial port subsystem 1214 for serial data communications which preferably conforms to Recommended Standard 232 (RS-232) promulgated by the Electrical Industries Association (EIA), and to a parallel port subsystem 1216 for parallel data transfer which preferably conforms to a Centronics standard.

Power supply 1220 may receive electrical power for operating hardware components 1200 and additional power utilizing mechanisms of printer 100 from one or more available power sources. For example, power supply system 1220 may receive DC power from an AC/DC converter 1222 which converts an AC power input 1242 into DC power at a level utilizable by power supply system 1220. Power supply system 1220 may also receive DC power directly from a battery 1224 disposed within printer housing 110 of printer 100. Hardware system 1200 and printer 100 may receive operational power from battery 1224 during portable operation of printer 100. For example, U.S. Pat. Nos. 5,347,115 and 5,484,991 disclose a portable modular work station including a printer and portable data collection terminal having a carrying handle attached to a side wall of a printer for portable use. Printer 100 of the present invention may be similarly adapted for portable operation as the printer disclosed in said patents. Said U.S. Pat. Nos. 5,347,115 and 5,484,991 are hereby incorporated by reference in their entireties. In such a portable utilization of printer 100, power supply system 1220 may function as a self-contained power source as disclosed in U.S. Pat. No. 5,186,558 which is hereby incorporated by reference in its entirety. In another mode of operation of printer 100, power supply system 1220 receives power from a DC power source 844 such as the system power of a vehicle in which printer 100 is utilized.

Printer control system 1228 couples with keyboard and display 1226 which functions as the control system of keyboard and display 112 of FIG. 1. Printer control system 1228 additionally couples to an RJ-11 jack 1236 for coupling and communicating with an external device. Printer control system 1228 controls a paper feed motor 1238 that drives paper feeding mechanism 210, and further controls a carriage motor 1246 and a print head motor 1240 that respectively drives and actuates printing mechanism 212 shown in FIG. 7. Home detect hardware 1230 detects when paper fed into printer 100 is in a home, or beginning, position. Paper information hardware 1232 detects the presence and type of paper fed into printer 100. Timing control hardware 1234 sends a timing control signal to printer control system 1228 for synchronizing the operations of printer 100.

Figure 13:
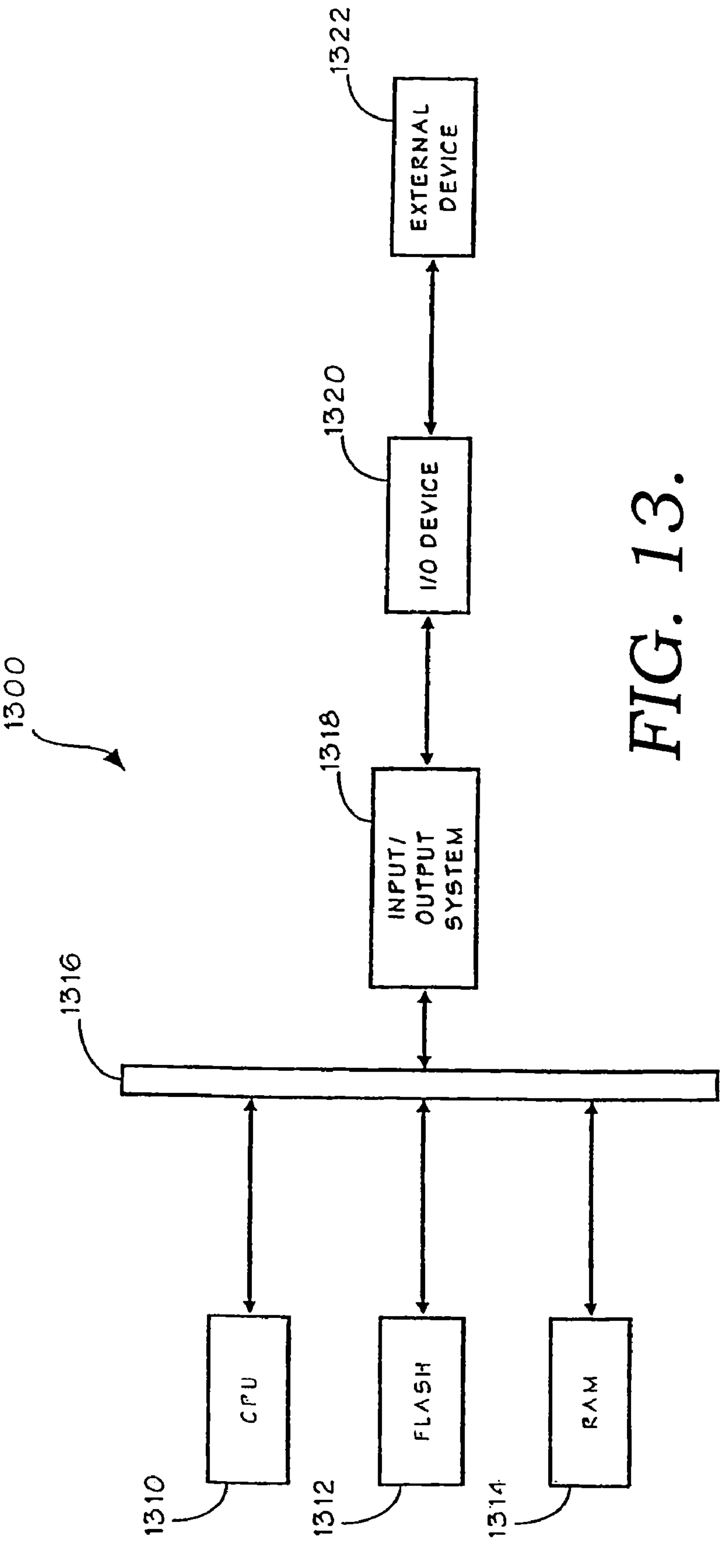
FIG. 13 is a block diagram of a hardware system for a portable electronic printing system in accordance with the present invention.

Referring now to FIG. 13 a hardware system for a portable electronic printing system in accordance with the present invention will be discussed. The hardware system shown in FIG. 13 is generally representative of the hardware architecture of a computer hardware implemented system of the printer 100 of the present invention. A central processing system 1310 controls printer hardware system 1300. Central processing system 1310 includes a central processing unit such as a microprocessor or microcontroller for executing programs, performing data manipulations and controlling the tasks of hardware system 1300. Communication with the central processor 1310 is implemented through a local system bus 1316 for transferring information among the components of the hardware system 1300. Bus 1316 may include a data channel for facilitating information transfer between storage and other peripheral components of the hardware system. Bus 1316 further provides the set of signals required for communication with the central processing system 1310 including a data bus, address bus, and control bus. Bus 1316 may comprise any state of the art bus architecture according to promulgated standards, for example industry standard architecture (ISA), extended industry standard architecture (EISA), Micro Channel Architecture (MCA), peripheral component interconnect (pen local bus, standards promulgated by the Institute of Electrical and Electronics Engineers (IEEE) including IEEE 488 general-purpose interface bus (GPIB), IEEE 696/S-100, and so on. Other components of the hardware system 1300 include flash memory 1312 and random access memory (RAM) 1314. Random access memory 1314 provides storage of instructions and data for programs executing on the central processing system 1310, and is typically semiconductor based memory such as dynamic random access memory (DRAM) and or static random access memory (SRAM). Flash memory 1312 provides storage of instructions and data that are loaded into RAM 1314 before execution. Flash memory 1312 is non-volatile memory that includes a boot block, diagnostic block, control program section, and a file system section. The file system section is utilized to maintain downloaded fonts and other types of data files. At least eight kilobytes of flash memory is available for storing downloaded fonts. The file system section of flash memory 1312 allows for new fonts or font updates to be downloaded and saved in flash memory. As a result, printer 100 is able to be modified for utilization.

Flash memory 1312 may alternatively comprise other types of semiconductor based memory such as read-only memory (ROM), programmable read-only memory (PROM) erasable programmable read-only memory (EPROM), electrically erasable read-only memory (EEPROM). Other types of memory devices are contemplated as well without departing from the scope of the present invention. Generally, printer control system 1228 of FIG. 12 may be considered to include central processing system 1310, flash memory 1312, random access memory 1314 and bus 1316 of FIG. 13.

Hardware system 100 further includes an input/output (I/O) system 1318 for connecting to one or more I/O devices 1320. Input/output system 1318 may comprise one or more controllers or adapters for providing interface functions between I/O device 1320. For example, input/output device 1320 may comprise a serial port, parallel port, infrared port, network adapter radio-frequency (RF) communications adapter, universal asynchronous receiver-transmitter (UART) port, etc., for interfacing between an external device 1322.

Generally, I/O system 1218 of FIG. 12 may correspond to input/output system 1318 of FIG. 13. and I/O device 1320 may correspond to any of the I/O devices shown in FIG. 12 (IR 1210, TTL 1212, RJ-11 1236, keyboard and display 1226, etc.).

Input/output system 1318 and I/O device 1320 may provide or receive analog or digital signals for communication between hardware system 1300 of the present invention and additional external devices, networks, or information or data sources. Input/output system 1318 and I/O device 1320 preferably implement industry promulgated architecture standards, including Ethernet IEEE 802 standards (e.g., IEEE 802.3 for broadband and baseband networks, IEEE 802.3z for Gigabit Ethernet, IEEE 802.4 for token passing bus networks; IEEE 802.5 for token ring networks, IEEE 802.6 for metropolitan area networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of the hardware system 1300 of FIG. 13 by one having ordinary skill in the art would not depart from the scope or the spirit of the present invention.

Figure 14:
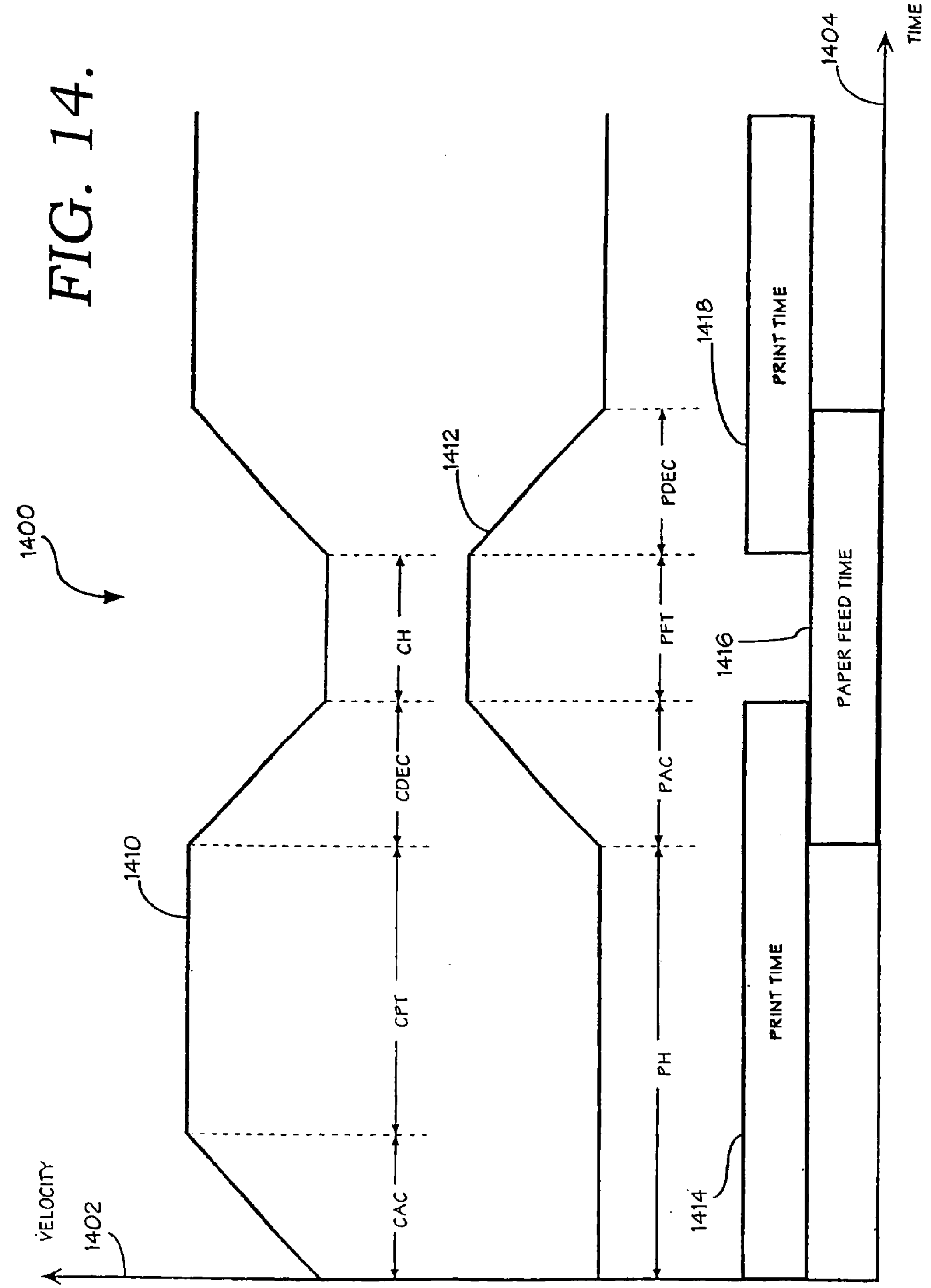
FIG. 14 is a timing diagram for illustrating simultaneous dual motor control of a printer in accordance with the present invention.

Referring now to FIG. 14, a timing diagram for illustrating simultaneous dual motor control of a printer in accordance with the present invention will be discussed. Printer 100 is capable of allowing paper feed motor 1238 to operate during periods of operation of carriage motor 1246 and print head 1240. As illustrated by the timing diagram 1400, vertical axis 1402 represents relative motor velocity while horizontal axis 1404 represents time. Plot 1410 represents the velocity of carriage motor 1246 with respect to time, and plot 1412 represents the velocity of paper feed motor 1238 with respect to time. One period of carriage motor 1246 defined by plot 1410 may be described as follows: during period CAC, carriage motor 1246 is accelerating; during period CPT, carriage motor 1246 is operating at a constant velocity; during period CDEC, carriage motor 1246 is decelerating; and during period CH, carriage motor is in a hold state. The periods CAC, CPT, CDEC, and CH together define one period of the velocity of carriage motor 1246. One period of paper feed motor 1238 defined by plot 1412 may be described as follows: during period PH, paper feed motor 1238 is in a hold state; during period PAC, paper feed motor 1238 is accelerating; during period PFT, paper feed motor 1238 is operating at a constant velocity; and during period PDEC, paper feed motor 1238 is decelerating. The periods PH, PAC, PFT, and PDEC together define one period of paper feed motor 1238.

The block of time 1414 represents a period of time that may be considered print time. During print time 1414, carriage motor 1246 is receiving a signal from printer control system 1228 causing carriage motor 1246 to move. Owing print time 1414, carriage motor 1246 is accelerating (CAC), moving at a constant velocity (CPT), or decelerating (CDEC). The block of time 1416 represent a period of time that may be considered paper feed time. During paper feed time 1416, paper feed motor 1238 is accelerating (PAC), moving at a constant velocity (PFT), or decelerating (PDEC). Print time 1418 represents a new block print time. As can be seen from FIG. 14, printer control system 1228 simultaneously controls both carriage motor 1246 and paper feed motor 1238 such that there is some overlap between print time 1414 and paper feed time 1416, and between paper feed time 1416 and print time 1218. Thus, while carriage motor 1246 is still in motion, movement of paper feed motor 1238 may be initiated. The overlapping of motion of carriage motor 1246 and paper feed motor 1238 provides a reduction in printing time for a given print job. It has been determined that the overlapping of motor motion may reduce the print speed from 90 seconds to 50 seconds for a predetermined printing job, thereby reducing printing time by approximately 44%.

In operation, overlapping motor control of the present invention as illustrated by timing diagram 1400 allows paper feed motor 1238 to be operating while carriage motor 246 is operating at the same time. Paper feed motor 1238 advances paper while carriage motor 1246 is decelerating during period CDEC. Paper feed motor 1238 is not required to wait for carriage motor 1246 to completely stop for the paper to advance. The method for simultaneous motor control is controlled by printer control system 1228 that includes a processor for interpreting and executing control functions of printer control system 1228. A direct memory address (DMA) channel is utilized to advance the paper with paper feed motor 1238, and an interrupt mechanism is utilized to control carriage motor 1246. The control and management of carriage motor 1246 and paper feed motor 1238 may be implemented by computer readable code, or software, executed by processing system 1310 of printer control system 1228. Printing data may be received by hardware 20 system 1200 of printer 100 via an external I/O interface of 110 system 1218, such as parallel port 1216, from a device connected to printer 100 such as a portable data terminal (not shown). The printing information is received by printer control system 1228 that converts the printing information into a series of motor inputs for carriage motor 1246 and paper feed motor 1238. The motors respond to the motor inputs received from printer control system and move according to the motor input signals. The motion of the motors is plotted as motor velocity versus time as depicted in FIG. 14.

In addition to information for controlling the movement of carriage motor 1246 and paper feed motor 1238, printing information received from an external device also contains actual print data which contains the characters to be printed onto the paper. A print head 1240 disposed in the carriage controlled by carriage motor 1246 prints the print data onto the paper in a linear fashion as carriage motor 1246 across the paper at constant velocity. Thus, print head 1240 is actuated to print on the paper during the constant velocity period (CPT). Since it is normally not desired to be simultaneously feeding the paper while print head 1240 is printing print data onto the paper, the only restriction upon actuation of paper feed motor 1238 is that paper is not fed or advanced while print head 1240 is printing. Since the deceleration period CDEC of carriage motor 1246 occurs upon completion of print head 1240 printing an amount of print data, paper feed motor 1238 acceleration period PAC may occur simultaneously with the deceleration period CDEC of carriage motor 1246 as illustrated in FIG. 14.

The relative timing between carriage motor velocity 1410 and paper feed motor velocity 1412 is based upon the motion of carriage motor 1246. A determination is made regarding the amount of time required for paper feed motor 1238 to perform a paper feed. Deceleration time CDEC of carriage motor 1246 is overlapped with the acceleration time PAC of paper feed motor. If necessary, paper feed acceleration time PAC may extend into carriage hold time CH. Additionally, constant velocity periods (CPT and PFT) overlap with a hold period of the other motor (PH and CH), such that at least one motor is in motion at any given time.

Carriage motor 1246 and paper feed motor 838 are preferably stepper motors such that printer control system 1228 may control when in time and how much each motor steps. Time is the equation here. It is the equation of time. Carriage acceleration time PAC is always a constant and is a known quantity, only varying with the preselected printing speed. If a higher resolution is selected, printing occurs at a slower speed. Printing speed may vary from line to line, depending on what speed printer 100 is set to print each line. The higher the selected resolution, the slower printer 100 will print. For a given resolution, this is a fixed time. Printing time is an unknown until the data for each line is actually received at which point printing time may be determined since printing speed number of printing dots required, to be printed for the selected resolution are known.

Paper feed time 1416 is based on line pitch. For example, paper feed motor may be selected to feed at one-eighth inch or one-sixth inch line increments. Paper feed time 30 may be determined from the selected line pitch, and line spacing. Print time 1414 is determined based upon the total number of characters to be printed and the selected resolution. If paper feed time FP plus T is greater than TC hold begin, plus C hold end, then C hold begin plus C hold end plus equals the "difference of the two. That would account for the stretch. For print time, we have to know the rate, the resolution, and the number of characters. The number of characters is based upon whether this is at the beginning of a line or showing at the end of the line, or the characters are elite font or a pica font. While print head 1240 is printing during carriage motor constant velocity CPT, paper feed acceleration PAC cannot be initiated. Likewise, when paper feed motor 1238 is decelerating during period PDEC, print head 1240 cannot be printing, that is carriage motor constant velocity period CPT cannot occur, however all the other events may occur. The only exclusion is that you can't actually be putting dots on paper while you are paper feeding. Thus, paper feed motor hold time PH is adjusted to accommodate carriage motor constant velocity time CPT (i.e., the time during which print head 1240 is printing). Additionally, the carriage motor hold time CH is adjusted to accommodate paper feed time. Print time and paper feed time are determined from incoming print data as printer 100 receives the print data.

Figure 15:
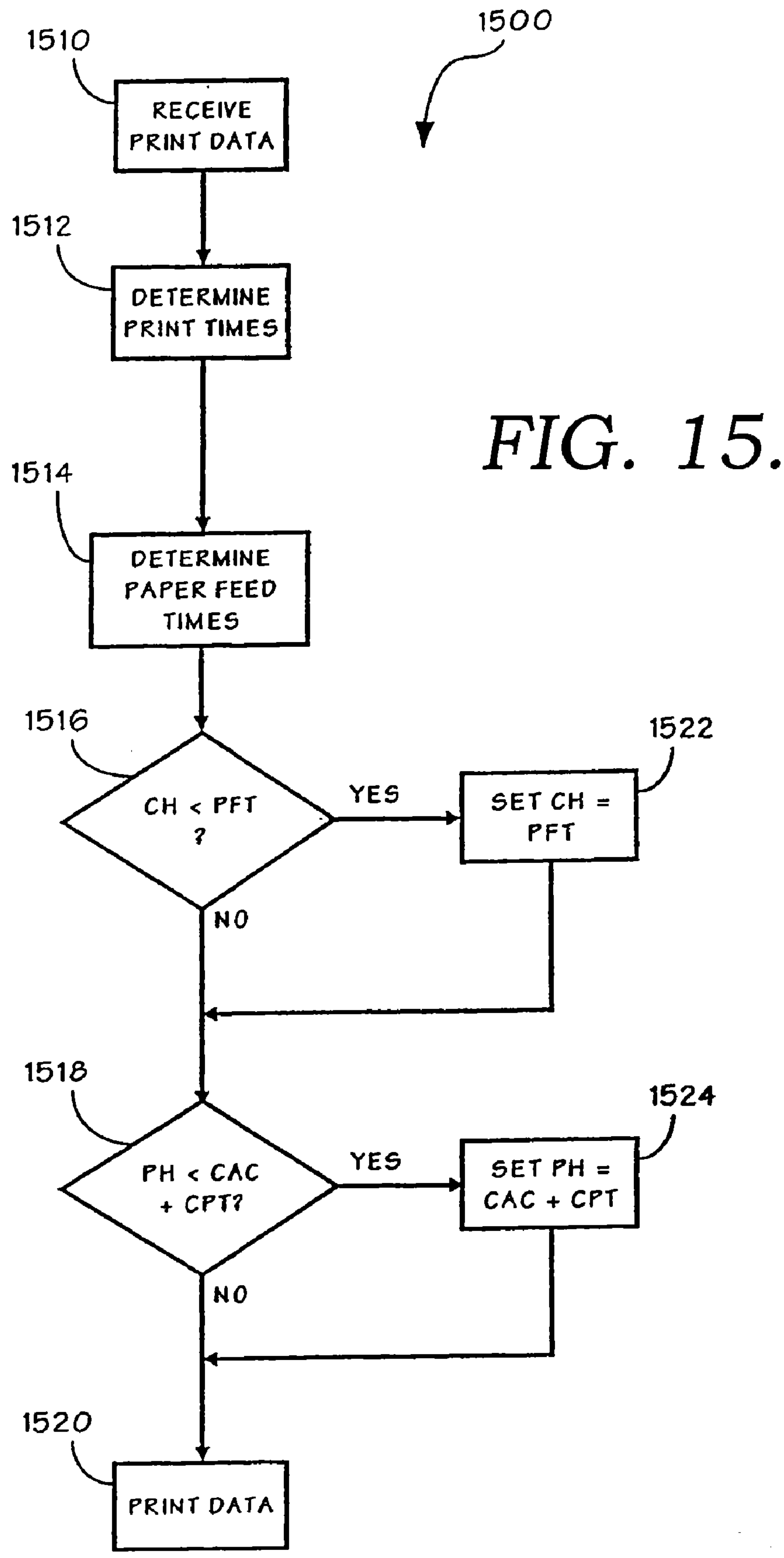
FIG. 15 is a flow diagram illustrating a method of operation of the printing control system in accordance with the present invention.

Referring now to FIG. 15, a flow diagram illustrating a method of operation of the printing c0lili61 system in accordance with the present invention will be discussed. During implementation of method 1500, printer 100 receives print data from an external device at step 1510. The required printing time and paper feed time to print the received print data and to feed the paper through printer 100 are determined at steps 1512 and 1514, respectively. A determination is made at step 1516 whether the carriage hold time CH is sufficient to accommodate the printer feed time PIT by determining whether carriage hold time CH is less than printer feed time PIT. If carriage hold time CH is less than printer feed time PFF, then carriage hold time is set or stretched, to equal printer feed time PFT at step 1522. A determination is made at step 1518 whether paper feed hold time PH is sufficient to accommodate carriage acceleration time CAC and carriage printing time CPT by determining whether paper feed hold time PH is less than the sum of carriage acceleration time CAC and carriage printing time CPT. If paper feed hold time PH is less than the sum of carriage acceleration time CAC and carriage printing time CPT, then paper feed hold time PH is set, or stretched, to equal the sum of carriage acceleration time CAC and carriage printing time CPT at step 1524. Finally, the received print data is printed at step 1520.

Figure 16:
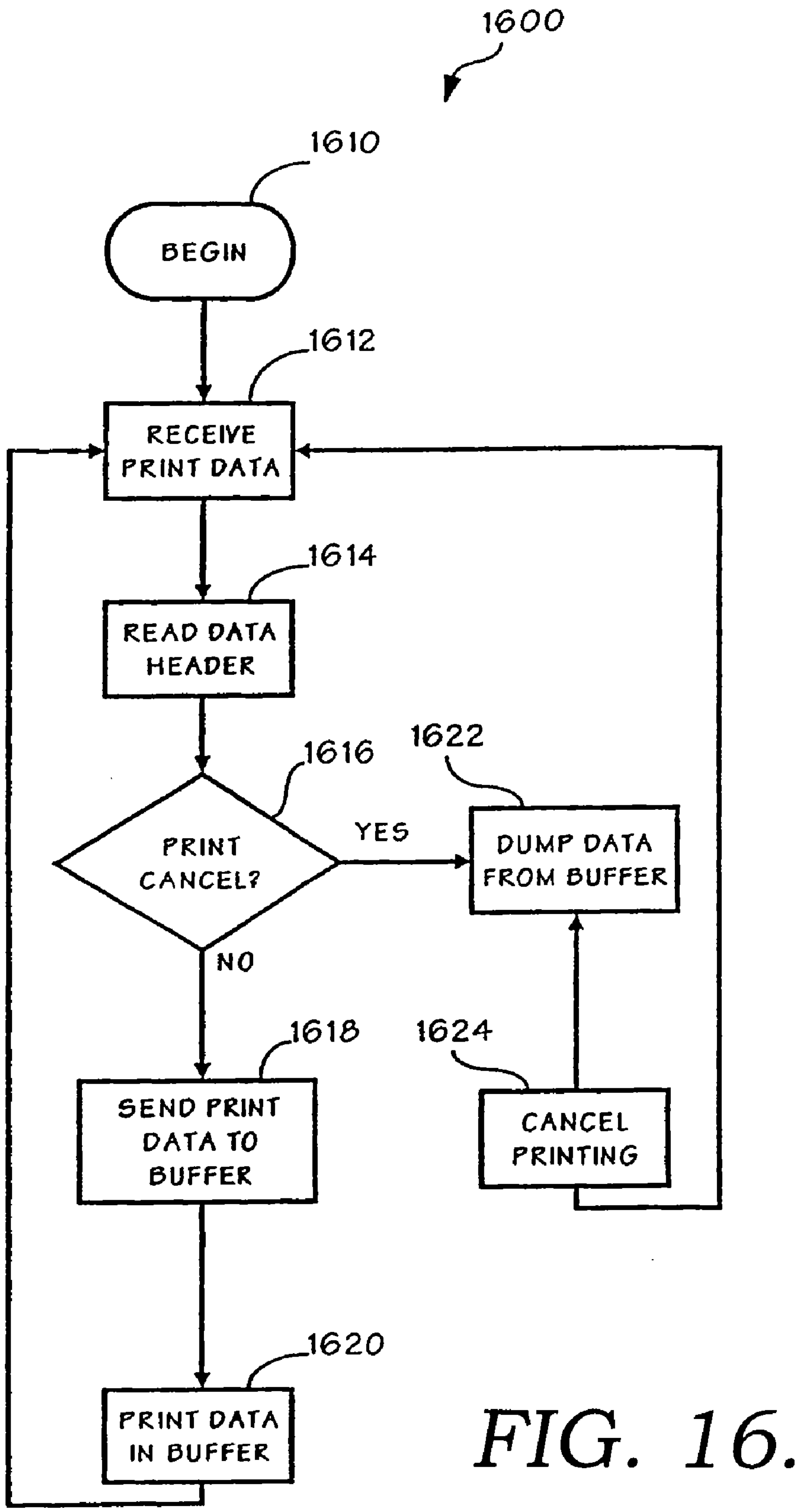
FIG. 16 is a flow diagram of a method for controlling and for canceling a printing operation of the printing system of the present invention.

Referring now to FIG. 16, a method for controlling and for canceling a printing operation of the printing system of the present invention will be discussed. The printing control method 1600 is implemented by printer control system 1228 of FIG. 12 using a serial printing interface. Printing control method 1600 begins at step 1610, and printer control system 1228 receives print data to be printed at step 1614. Print data includes a print header provides information to printing control system 1228 regarding action should be executed with the received print data. The print data header is read at step 1614. A determination is made at step 1616 based upon the print data header whether printing should be canceled. If the print data header does not indicate that printing should be canceled, the print data is sent to a buffer at step 1618. Print data accumulated in the buffer is printed at step 1620. Printer control system 1228 continues to receive print data as it is accumulated in the buffer so long as the print header of received print data does not indicate that printing should be canceled. The print data is printed from the buffer on a first-in, first-out (FIFO) basis such that print data is printed from the buffer in the order in which the-print data is received.

In the event that the print data header indicates that printing should be canceled, data accumulated in the buffer is dumped from the buffer at step 1622, thereby canceling the printing of the data in the buffer at step 1624. Since the print cancel command of the print data header is read at step 1616 prior to being sent to the buffer at step 1618, the print cancel command is executed at step 1622 prior to the print data being sent to the buffer rather than after being held in the buffer. Thus, method 1600 effectively places the print cancel command at the head of the printing queue, and printer control system 1228 may cancel printing immediately without having to print all of the data in the buffer prior to canceling printing.

Figure 17:
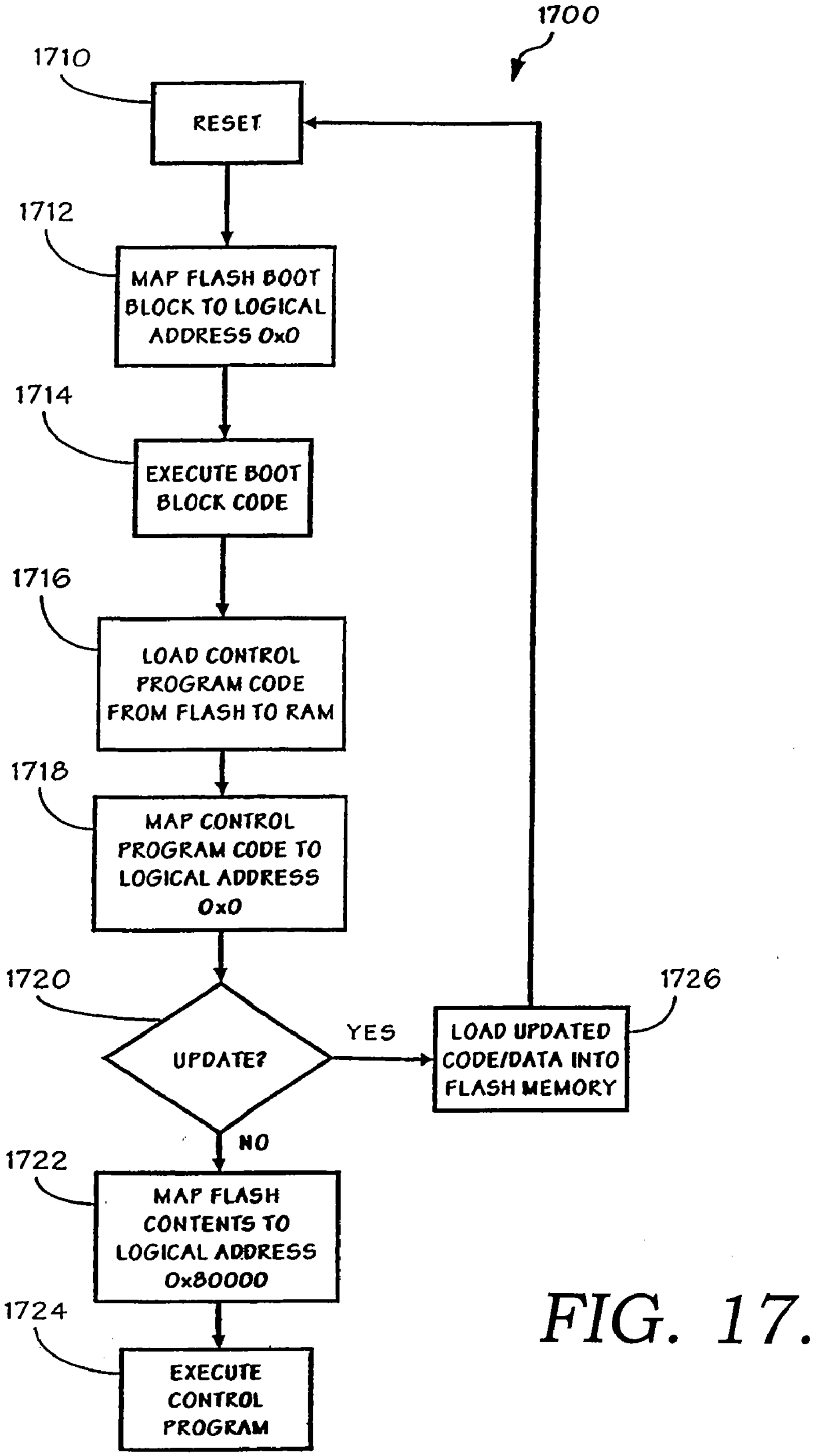
FIG. 17 is a flow diagram of a method for loading updated code or data into the printing system of the present invention.

Referring now to FIG. 17, a method for loading updated code or data into the printing system of the present invention will be discussed. The method 1700 initiates with the printer 100 being reset at step 1710. The boot block of flash memory 1312 is mapped to logical address 0x0 at step 1712. Boot block code is executed at step 1714 The printer control program is loaded from flash memory 1312 to RAM 1314 at step 1716. The control program is mapped to logical address 0x0 at step 1718. A determination is made whether there is an update for code or data stored in flash memory 1312. The updated code or data may be new boot block code, new diagnostic block code, new control program code, or new file system files such as font and character set data, for example. The updated code or data may be received by printer control system 1228 via I/O system 1218 or RJ-11 port 1236 or from an external device, host computer, communication link or network, for example. If there is an update for code or data, the updated code or data is loaded into flash memory at step 1726, and the system is reset at step 1710. If there is no update for code or data, the contents of flash memory are mapped to an available logical address beyond the end of the program code logical address, for example to address 0x80000, at step 1722. The control program is executed from RAM 1314 at step 1724.

Figure 18:
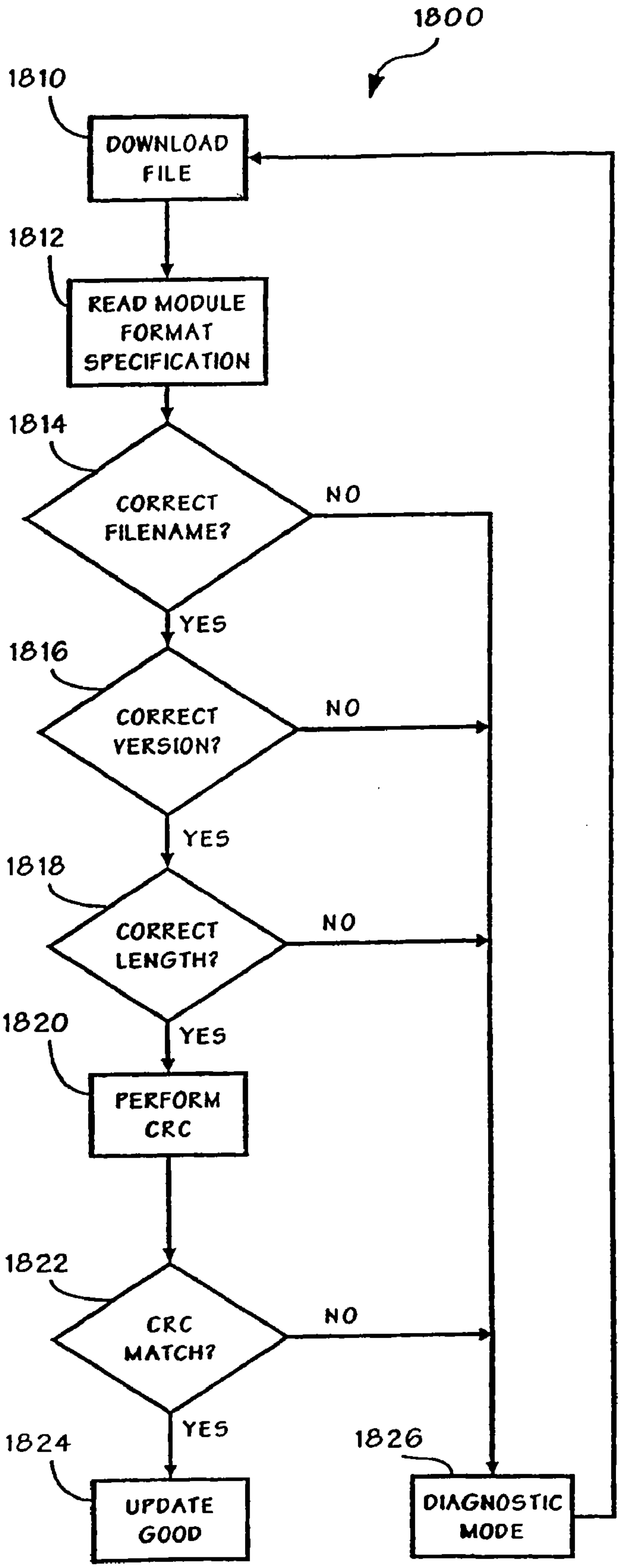
FIG. 18 is a flow diagram of a method for verifying updated code or data loaded into the printing system in accordance with the present invention.

Referring now to FIG. 18, a method for verifying updated code or data loaded into the printing system in accordance with the present invention will be discussed. The verification method 1800 is initiated upon printer 100 downloading a file for storage in flash memory 1312. A module format specification is included within the contents of the file itself. Themodule format specification includes the name of the file, the file version, the length of the file, and the cyclical redundancy check (CRC) value for the complete file. Printer control system 1228 reads the module format specification of the downloaded file at step 1812. A determination is made at step 1814 whether the filename in the module formation specification matches the file intended to have been downloaded. If the filename is determined to be incorrect, then printer 100 enters into a diagnostic mode at step 1826. A determination is made at step 1816 whether the file version in the module formation specification matches the version intended to have been downloaded. If the version is determined to be incorrect, then printer 100 enters into a diagnostic mode at step 1826. A determination is made at step 1818 whether the file length in the module formation specification matches the length intended to have been downloaded. If the length is determined to be incorrect, then printer 100 enters into a diagnostic mode at step 1826. A cyclical redundancy check is performed on the file as downloaded at step 1820. A determination is made at step 1822 whether the CRC value in the module formation specification matches the CRG value resulting from step 1820. If the CRC value in the module formation specification does not match the CRC value resulting from step 1820, then printer 100 enters into a diagnostic mode at step 1826. If all tests of the information of the module format specification are verified, then the updated file is determined to be good, and the completeness of file download is verified at step 1824. If at test of the information of the module format specification is not verified, a diagnostic mode is entered into at step 1826, and the file is downloaded again at step 1810.

Figure 19:
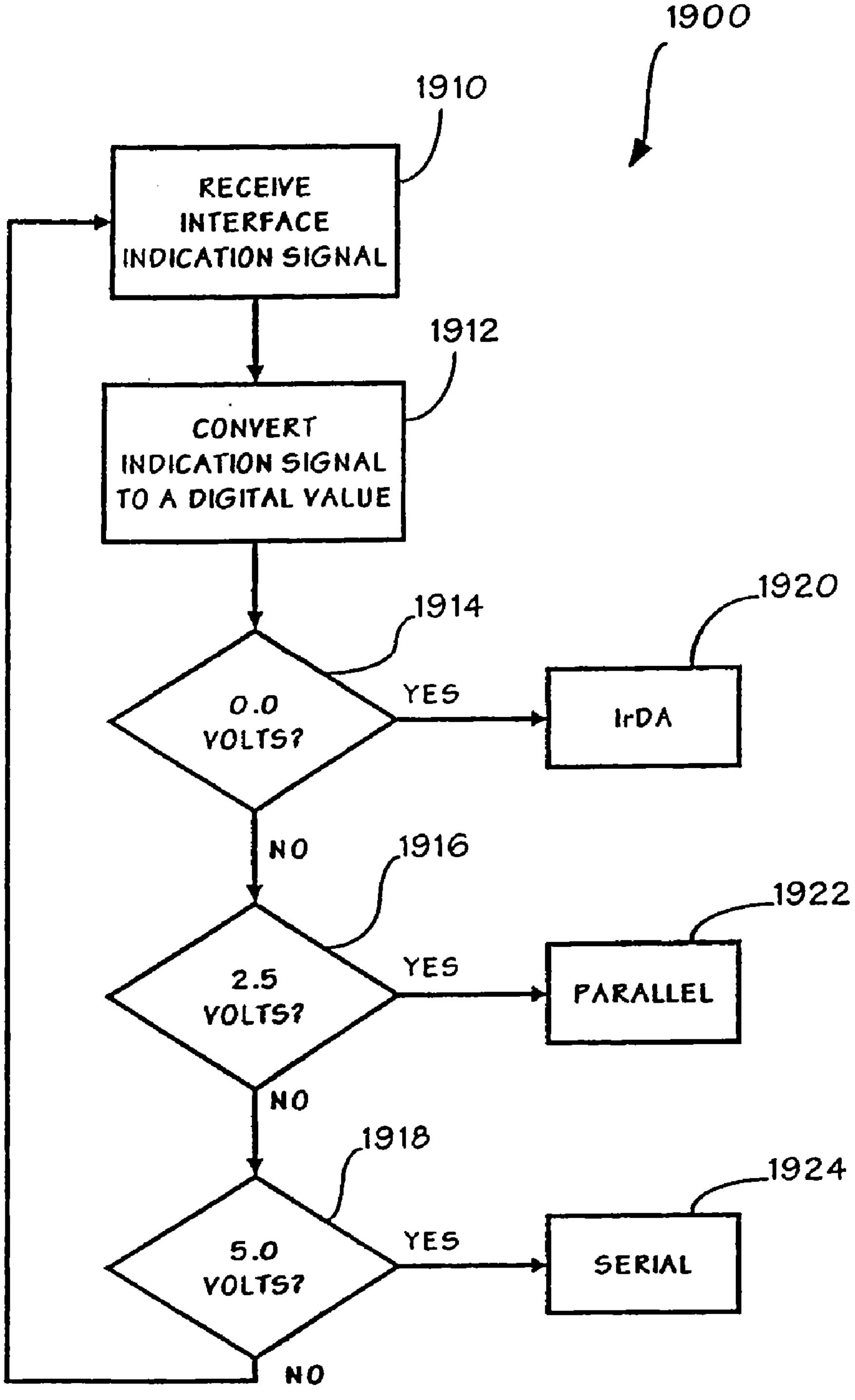
FIG. 19 is a flow diagram of a method for automatically determining the communication protocol for data received by the printer of the present invention.

Referring to FIG. 19, a method for automatically determining the communication protocol for data received by the printer of the present invention will be discussed. The method 1900 initiates upon printer control system 1228 receiving data from an external device via I/O system 1218. An interface indication signal is received at step 1910 that indicates to printer control system 1228 the communications protocol and interface utilized for the transmission of the data. The interface indication signal may be an analog signal whose value continuously varies from over a range of values. The interface indication signal is converted to a digital value readable by printer control system 1228 at step 1912. For example, the interface indication signal may be converted from an analog value to digital value using an analog-to-digital converter implemented by printer control system 1228. The value of the interface indication signal may then be determined. If the value of the interface indication signal is determined to be on the order of a first value, for example 0.0 volts, at step 1914, then it is determined that a first communication protocol is utilized, for example infrared (IrDA), at step 1920. If the value of the interface indication signal is determined to be on the order of a second value, for example 2.5 volts, at step 1916, then it is determined that a second communication protocol is utilized, for example parallel data communications, at step 1922. If the value of the interface indication signal is determined to be on the order of a third value, for example 5.0 volts, at step 1918, then it is determined that a third communication protocol is utilized, for example serial data communications, at step 1924. If the value of the interface indication signal is not determined, or not within a predetermined range, then receipt of the interface indication signal is repeated at step 1912 until a valid value is determined.

Figure 20:
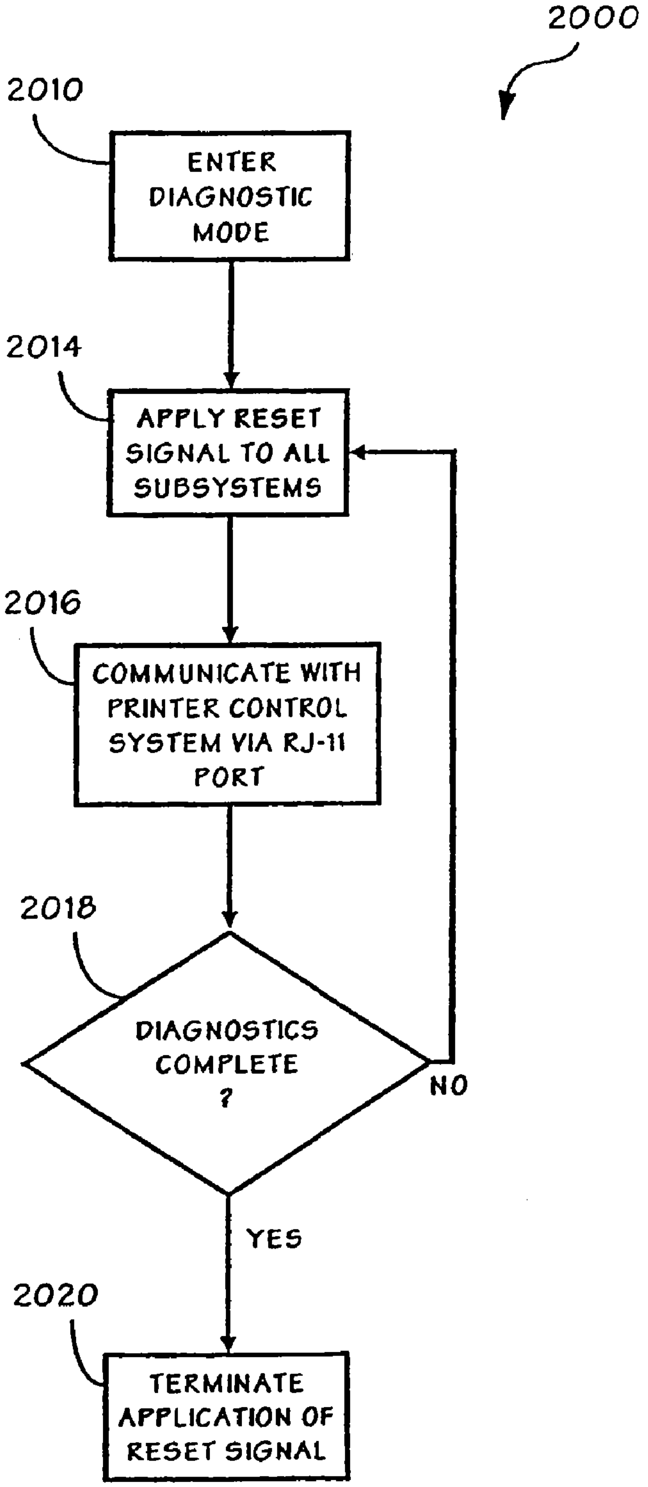
FIG. 20 is a flow diagram of a method for controlling communication during a diagnostics mode.

Referring now to FIG. 20, a method for controlling communication during a diagnostics mode will be discussed. The method 2000 is initiated upon printer 100 entering into a diagnostic mode at step 2010. A reset signal is applied to all subsystems at step 2014, thereby preventing devices from communicating with printer control system 1228 via I/O system 1218. An external diagnostic performing device is capable of directly communicating with printer control system 1228 via RJ-11 port 1236 without any interference from an external device via I/O system 1218. While the external device is performing diagnostic routines upon printer control system 1228 as determined at step 2018, application of the reset signal is maintained at step 2014. Upon completion of the diagnostic routines, application of the reset signal to the printer subsystems is terminated at step 2020. Thus, method 2000 allows for direct communication with printer control system 1228 by an external device during diagnostics via RJ-11 port 1236 rather than via I/O system 1218. With I/O system 1218 shut down, no other device is capable of inadvertently communicating with printer control system 1228 and interfering with the diagnostic routines.

Figure 21:
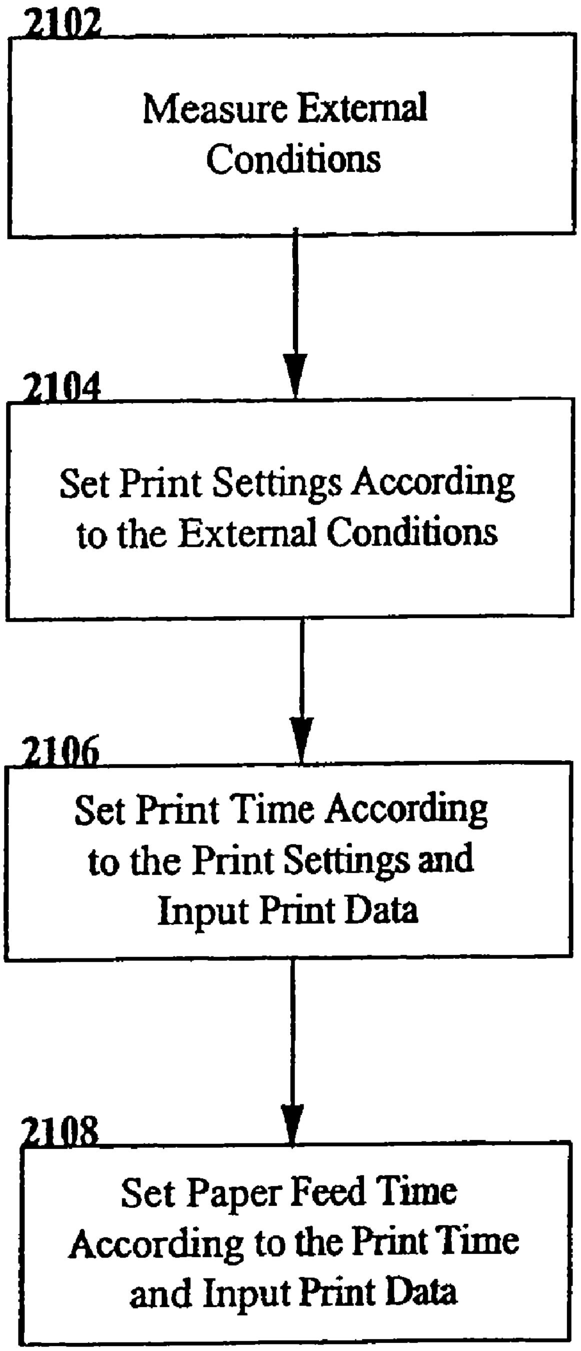
FIG. 21 is a flow diagram illustrating a method of operation of a printing system in accordance with an embodiment of the present invention.

Referring now to FIG. 21, a method of operation of a printing system in accordance with the present invention is illustrated by a flow diagram. A print system in accordance with the embodiment of FIG. 21 first measures at least one external condition, (step 2102) of the print system; It is understood that the external condition could be anything that affects the operation of the print system. For instance, the external condition could be the composition or thickness of the print media used in the print system. In a preferred embodiment, however, the external condition is an environmental condition at the locality of the print system. For instance, the external condition could be the environmental temperature, barometric pressure, atmospheric pressure, dew point, or any other climatic condition that might affect the operation of the printer system. In a presently most preferred embodiment, the environmental condition is the temperature at the locality of the printer system, but it should be emphasized that with knowledge of this disclosure, other external conditions which affect the operation of a printer system will become apparent to one with ordinary skill in the art. Such external conditions are within the spirit and scope of this disclosure.

Once the external condition (e.g. the temperature) has been measured in step 2102, the print settings or printer operating conditions are set according to the measured external condition (step 2104). Examples of print settings that might be available in accordance with the present invention include the settings for any printing function that is affected by the measured external condition in step 2102, By way of example and not limitation, the print settings might be the temperature of operation of the printing system or the impact force of a contact printer. In a preferred embodiment, the print setting that is set in step 2104 is the print impact force of a contact printer.

The print system may utilize computer circuitry to properly determine the correct setting of step 2104 based on the measured data of step 2102. By way of example and not limitation, the printer system may use a table which equates external conditions to proper print settings. The table may be created by theoretical calculations known in the art, or experimentally.

Once the print settings are set in step 2104, the print time is set in accordance with the print settings (step 2106). The goal is to substantially minimize the print time for every given print setting. Again, tables (created either theoretically or experimentally) or mathematical equations can be used to determine the minimum print time in step 2106 from the setting of step 2104 and the input print data. Based on the input print data and the print time, the paper feed time is set. Reference is made to FIG. 14 where, by way of example, the paper feed time (PFT) may be selected, and paper hold time (PH) may be set such that PH=CAC+CPT. It should be noted that in this example of FIG. 14, the printer will operate with overlapping of print drive times 1414 and paper feed times 1416 with CH somewhat greater than PFT or with PH somewhat greater than CAC+CPT. Thus, deviations from the preferred equalities are within the scope of this disclosure. However, print speed is maximized in accordance with the present invention when CH=PFT and PH==CAC+CPT.

Figure 22:
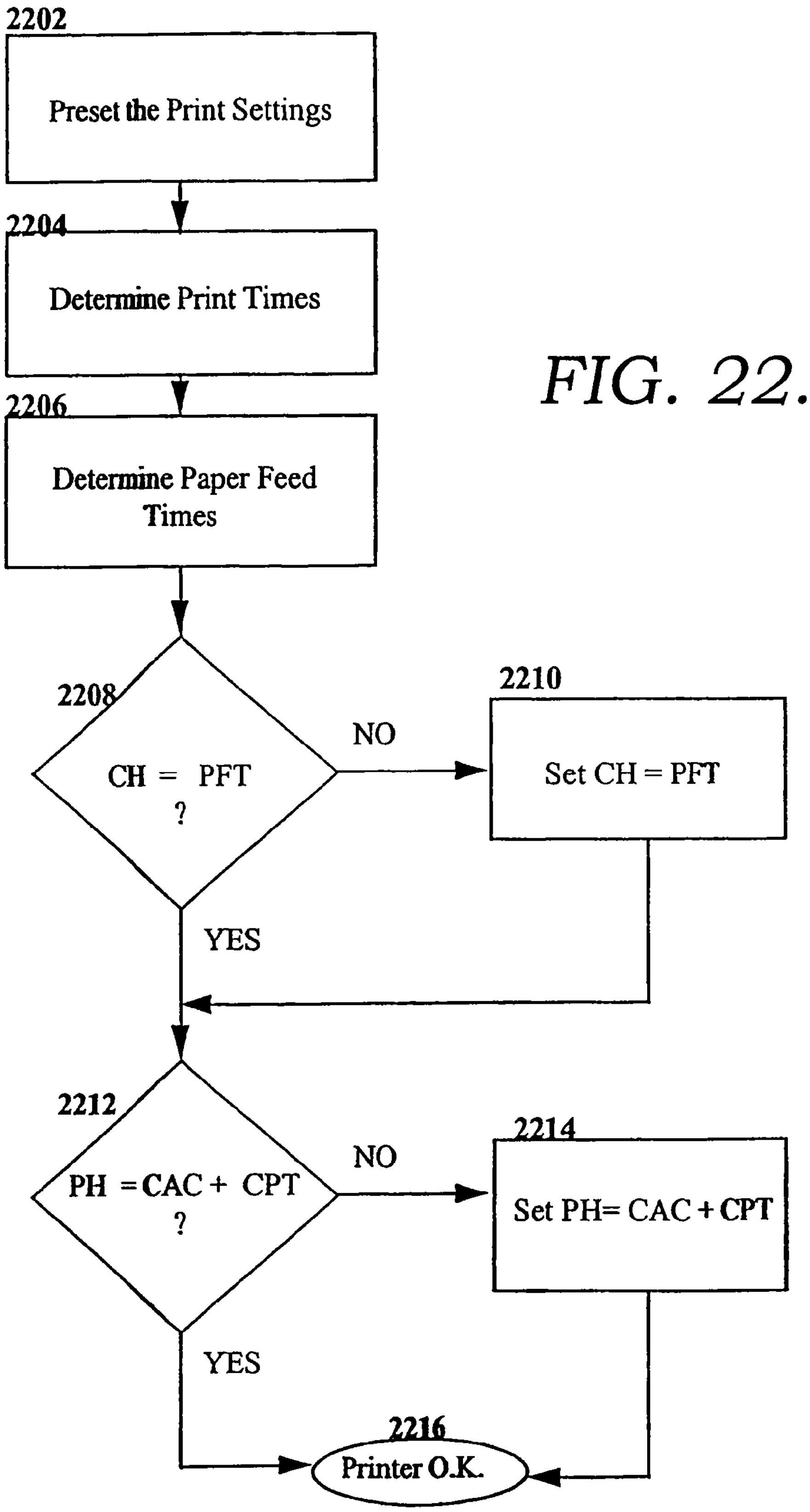
FIG. 22 is a flow diagram illustrating a method of operation of a printing system in accordance with an embodiment of the present invention.

Referring now to FIG. 22, another method of operation of a printing system in accordance with the present invention is illustrated by a flow diagram. In the embodiment of FIG. 22, the printer system is preset to the desired print settings (step 2202). This may take place by the manual data entry of an end user into either the printer system itself or a computer communicatively coupled to the printer system. The printer system then determines the print times (step 2204) and determines paper feed times (step 2206) according to the preset print settings. In steps 2204 and 2206, either the print system or computer communicatively coupled thereto may utilize a table (created theoretically or experimentally) to determine the desired print time given the preset print settings and given input print data or to determine the desired paper feed time from the given print time.

To minimize the print time, the printer system or a computer communicatively coupled thereto compares CH to PFT (see FIG. 14). The printer will operate as long as CH>PFT; thus, deviations from the preferred equalities are within the scope of this disclosure. However, print speed is maximized in accordance with the present invention when CH=PFT. Maximization of print speed is effectuated in steps 2208 and 2210.

To further minimize print time, the printer system or a computer communicatively coupled thereto compares PH to CAC+CPT (see FIG. 14). Again, the printer will operate as long as PH>CAC+CPT; thus, deviations from the preferred equalities are within the scope of this disclosure. However, print speed is maximized in accordance with the present invention when PH=CAC+CPT. Maximization of print speed is effectuated in steps 2212 and 2214.

Figure 23:
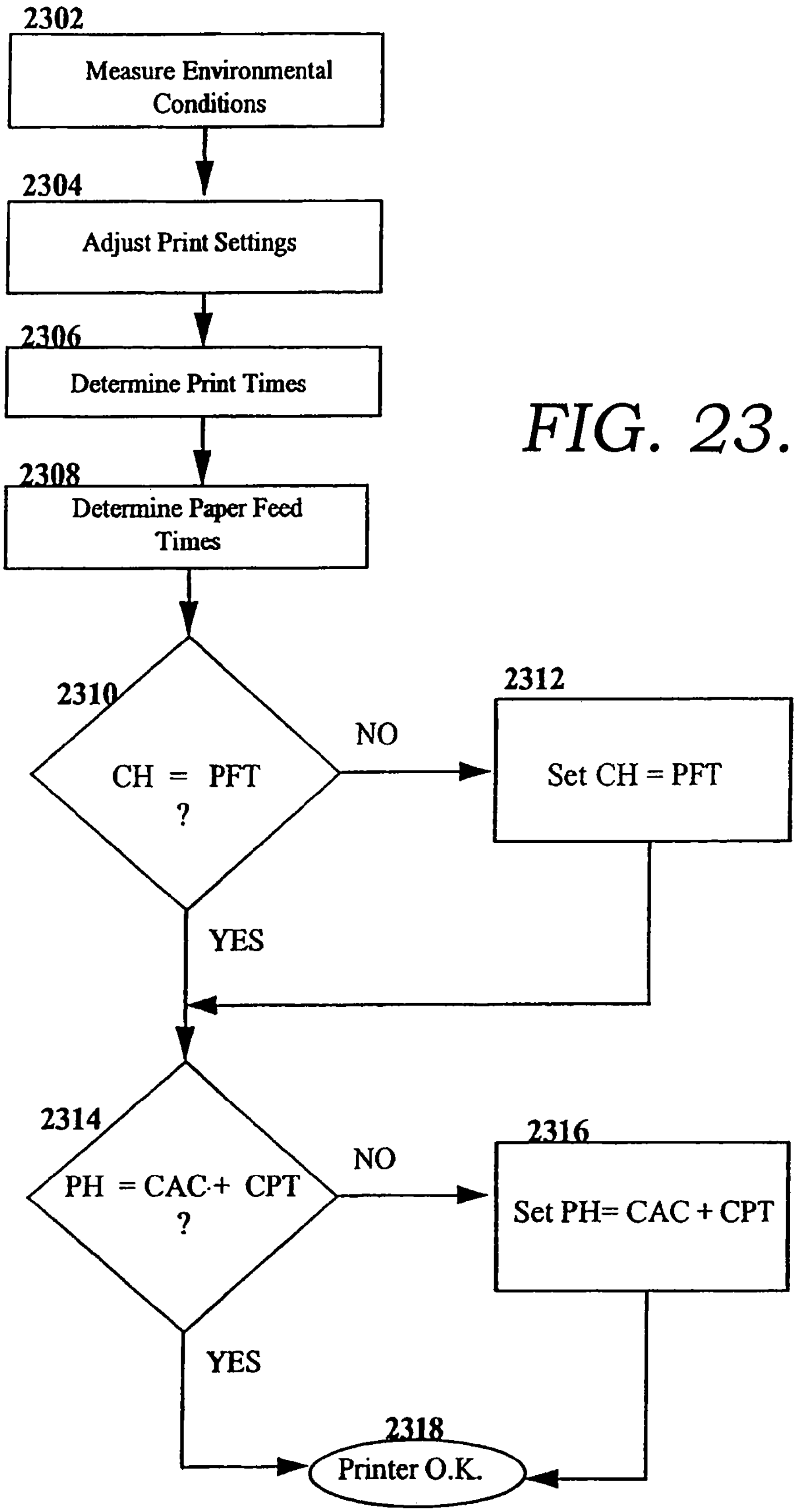
FIG. 23 is a flow diagram illustrating a method of operation of a printing system in accordance with an embodiment of the present invention.

Referring now to FIG. 23, another method of operation of a printing system in accordance with the present invention is illustrated by a flow diagram. In the embodiment of FIG. 23 environmental conditions are measure<fin step 2302 by either circuitry in the printer or a computer communicatively coupled thereto. The print settings are then automatically adjusted in step 2304. Steps 2306-2318 are exactly the same as steps 2204-2216 of FIG. 22.

It is believed that the control system and method for a portable electronic printer of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

The invention claimed is:

1. A method for printing information with a printer apparatus, comprising the steps of:

activating a paper feed motor of a printer apparatus;

activating a carriage motor of a printer apparatus to run at least partially simultaneously with an activated paper feed motor; and controlling said step of activating the paper feed motor and said step of activating the carriage motor so as to reduce print time.

2. The method of claim 1, wherein the activated carriage motor has a deceleration stage following activation, and wherein said step of activating a paper feed motor activates the paper feed motor while the activated carriage motor is decelerating.

3. The method of claim 1, wherein the activated paper feed motor has a deceleration stage following activation, and wherein said step of activating a carriage motor activates the carriage motor while the activated paper feed motor is decelerating.

4. The method of claim 1, further comprising the steps of:

receiving print data;

determining paper feed time; and changing carriage motor hold time to equal the determined paper feed time if carriage motor hold time is currently set for a time less than the determined paper feed time.

5. The method of claim 4, further comprising the steps of:

determining carriage print time; and changing paper feed motor hold time to equal carriage acceleration time plus the determined carriage print time if paper feed motor hold time is currently set for a time less than carriage acceleration time plus the determined carriage print time.

6. The method of claim 5, further comprising the step of printing the received print data.

7. The method of claim 4, wherein said step of determining paper feed time comprises the step of determining line pitch for the received print data.

8. The method of claim 4, wherein said step of determining paper feed time comprises the step of determining line spacing for the received print data.

9. The method of claim 1, further comprising the steps of:

receiving print data;

determining carriage print time; and changing paper feed motor hold time to equal carriage acceleration time plus the determined carriage print time if paper feed motor hold time is currently set for a time less than carriage acceleration time plus the determined carriage print time.

10. The method of claim 1, wherein the method is performed in a portable printing apparatus.

* * * * *